US012803728B2

(12) United States Patent
Hayashi et al.

(10) Patent No.: US 12,803,728 B2
(45) Date of Patent: Nov. 17, 2026

(54) SECONDARY BASE STATION, MASTER BASE STATION, AND METHODS THEREFOR

(71) Applicant: NEC Corporation, Tokyo (JP)

(72) Inventors: Sadafuku Hayashi, Tokyo (JP); Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 471 days.

(21) Appl. No.: 18/024,397

(22) PCT Filed: Oct. 19, 2021

(86) PCT No.: PCT/JP2021/038509

§ 371 (c)(1),
(2) Date: Mar. 2, 2023

(87) PCT Pub. No.: WO2022/085652

PCT Pub. Date: Apr. 28, 2022

(65) Prior Publication Data

US 2023/0318762 A1 Oct. 5, 2023

(30) Foreign Application Priority Data

Oct. 20, 2020 (JP) ................................ 2020-176218

(51) Int. Cl.
*H04L 5/00* (2006.01)
*H04W 76/15* (2018.01)

(52) U.S. Cl.
CPC ........... *H04L 5/0035* (2013.01); *H04W 76/15* (2018.02)

(58) Field of Classification Search
CPC ..... H04L 5/0035; H04W 76/15; H04W 76/11; H04W 76/12; H04W 76/22; H04W 76/16; H04W 92/20
See application file for complete search history.

(56) References Cited

U.S. PATENT DOCUMENTS

| | | | | |
|---|---|---|---|---|
| 2019/0090144 | A1* | 3/2019 | Wu | H04W 24/04 |
| 2020/0120535 | A1* | 4/2020 | Dai | H04W 76/27 |
| 2020/0359276 | A1* | 11/2020 | Lee | H04W 36/0085 |
| 2020/0374689 | A1* | 11/2020 | Shi | H04W 4/24 |
| 2021/0235536 | A1* | 7/2021 | Shih | H04W 72/04 |
| 2022/0046522 | A1* | 2/2022 | Kim | H04W 48/16 |

(Continued)

OTHER PUBLICATIONS

International Search Report for PCT Application No. PCT/JP2021/038509, mailed on Dec. 14, 2021.

(Continued)

*Primary Examiner* — Nicholas A Jensen
*Assistant Examiner* — Ayodele Lawrence Olubodun

(57) ABSTRACT

A secondary base station (2) receives a request message from a master base station (1) of Dual Connectivity. If the secondary base station (2) uses an SN terminated bearer that uses both Master Cell Group (MCG) resources and Secondary Cell Group (SCG) resources, the secondary base station (2) transmits a request acknowledge message containing a UL Configuration information element to the master base station (1) as a response to the request message. This, for example, allows the master base station and the secondary base station to deal with a situation where multiple information elements contained in a control message for the setup of an SN terminated bearer using MCG resources are inconsistent.

30 Claims, 11 Drawing Sheets

(56) References Cited

U.S. PATENT DOCUMENTS

| | | | | |
|---|---|---|---|---|
| 2022/0141904 | A1* | 5/2022 | Yilmaz | H04W 76/27 370/329 |
| 2022/0182896 | A1* | 6/2022 | Talebi Fard | H04W 36/0085 |
| 2022/0287126 | A1* | 9/2022 | Orsino | H04W 76/16 |
| 2023/0292349 | A1* | 9/2023 | Lee | H04W 72/535 |
| 2023/0363026 | A1* | 11/2023 | Futaki | H04W 72/27 |

OTHER PUBLICATIONS

3GPP TS 37.340 V15.10.0 (Sep. 2020), “3rd Generation Partnership Project; Technical Specification Group Radio Access Network; Evolved Universal Terrestrial Radio Access (E-UTRA) and NR; Multi-connectivity; Stage 2 (Release 15)”, Sep. 2020.
3GPP TS 38.423 V15.9.0 (Sep. 2020), “3rd Generation Partnership Project; Technical Specification Group Radio Access Network; NG-RAN; Xn application protocol (XnAP) (Release 15)”, Sep. 2020.
Huawei, “(TP for BL CR for TS 38.423): UL usage in the UL split bearer”, 3GPP TSG-RAN3 #101-bis, R3-185778, Sep. 29, 2018.
ZTE, “Correction of UL link configuration in TS36.423”, 3GPP TSG-RAN WG3 #99bis, R3-181667, Apr. 5, 2018.
Extended European Search Report for EP Application No. 21882793.9, dated on Feb. 19, 2024.
3GPP, “3rd Generation Partnership Project; Technical Specification Group Radio Access Network; Evolved Universal Terrestrial Radio Access Network (E-UTRAN); X2 application protocol (X2AP) (Release 16)”, 3GPP TS 36.423 V16.3.0, Oct. 2, 2020, pp. 1-pp. 496.
Samsung, “BL CR to 36.423: Support for IAB”, 3GPP TSG-RAN WG3 #103bis R3-191175, Mar. 29, 2019, pp. 1-pp. 139.
Huawei, “Introduction of DL Forwarding indication for bearer type change”, 3GPP TSG-RAN3 Meeting #102 R3-186645, Nov. 3, 2018, pp. 1-pp. 13.
Nec et al, “UL Configuration handling in MR-DC”, 3GPP TSG-RAN WG3 #111-e R3-210236, Jan. 15, 2021, pp. 1-pp. 9.

* cited by examiner

SECONDARY BASE STATION, MASTER BASE STATION, AND METHODS THEREFOR

This application is a National Stage Entry of PCT/JP2021/038509 filed on Oct. 19, 2021, which claims priority from Japanese Patent Application 2020-176218 filed on Oct. 20, 2020, the contents of all of which are incorporated herein by reference, in their entirety.

TECHNICAL FIELD

The present disclosure relates to a radio communication system, and in particular to signaling between radio access network nodes for multi-connectivity (e.g., Dual Connectivity).

BACKGROUND ART

The 3rd Generation Partnership Project (3GPP) specifies signaling between Radio Access Network (RAN) nodes in Multi-Radio Dual Connectivity (MR-DC), i.e., between a Master Node (MN) and a Secondary Node (SN) (see, for example, Non-Patent Literature 1 and 2). In MR-DC, the MN is a RAN node that provides a control plane connection to the core network to the User Equipment (UE), while the SN is a RAN node that does not provide that control plane connection to the UE. In MR-DC, the group of one or more serving cells associated with the MN is referred to as the Master Cell Group (MCG) and the group of one or more serving cells associated with the SN is referred to as the Secondary Cell Group (SCG).

For example, the MN can request the SN to add or modify SN resources related to a PDU Session via a SN ADDITION REQUEST or SN MODIFICATION REQUEST message. With these messages, the MN can request the SN to set up or modify SCG resources for a bearer (MN terminated bearer) terminated at the MN. In MR-DC, an MN terminated bearer is a data radio bearer for which the Packet Data Convergence Protocol (PDCP) is placed in the MN. An MN terminated bearer that requires SCG resources is an MN terminated SCG bearer or an MN terminated split bearer. An SCG bearer is a radio bearer having its Radio Link Control (RLC) bearer only within the SCG. A Split bearer is a radio bearer that has both an RLC bearer in the MCG and an RLC bearer in the SCG. These MN terminated bearers that require SCG resources need resources (i.e., an Xn-U bearer or Xn-U tunnel) on a user plane interface (i.e., Xn-U interface) between the MN and the SN for delivery of PDCP data (i.e., PDCP Protocol Data Units (PDUs)).

In addition, for example, the SN can request the MN to add or modify MN resources related to a PDU Session via SN ADDITION REQUEST ACKNOWLEDGE, SN MODIFICATION REQUEST ACKNOWLEDGE, or SN MODIFICATION REQUIRED message. Using these messages, the SN can request the MN to set up MCG resources for a bearer (SN terminated bearer) terminated at the SN. An SN terminated bearer is a data radio bearer for which the PDCP is placed in the SN. An SN terminated bearer that requires MCG resources is an SN terminated MCG bearer or an SN terminated split bearer. An MCG bearer is a radio bearer that has its RLC bearer only within the MCG. These SN terminated bearers that require MCG resources need resources (i.e., an Xn-U bearer or Xn-U tunnel) on a user plane interface (i.e., Xn-U interface) between the MN and the SN for delivery of PDCP data (i.e., PDCP PDUs).

CITATION LIST

Non Patent Literature

[Non-Patent Literature 1] 3GPP TS 37.340 V15.10.0 (2020-09) "3rd Generation Partnership Project; Technical Specification Group Radio Access Network; Evolved Universal Terrestrial Radio Access (E-UTRA) and NR; Multi-connectivity; Stage 2 (Release 15)", September 2020

[Non-Patent Literature 2] 3GPP TS 38.423 V15.9.0 (2020-09) "3rd Generation Partnership Project; Technical Specification Group Radio Access Network; NG-RAN; Xn application protocol (XnAP) (Release 15)", September 2020

SUMMARY OF INVENTION

Technical Problem

According to the current 3GPP specifications, when requesting the SN to setup SCG resources for an MN terminated bearer, the MN includes into a SN MODIFICATION REQUEST message a PDU Session Resource Setup Info—MN terminated information element (IE) containing a DRBs to Be Setup Item IE associated with the MN terminated bearer. This DRBs to Be Setup Item IE can include a UL Configuration IE. In the current specifications, the UL Configuration IE is optional. The UL Configuration IE indicates how the UE will use the uplink of the SN for the MN terminated bearer. More specifically, the UL Configuration IE can be set to the value "no data", the value "shared", or the value "only". The value "no data" means that the UE 3 does not use the uplink of the corresponding node (i.e., SN) for the radio bearer in question (i.e., MN terminated bearer). The value "shared" means that the UE uses both the uplink of the corresponding node (i.e., SN) and the uplink of the other node (i.e., MN) for the radio bearer (i.e., MN terminated bearer). The value "only" means that the UE uses only the uplink of the corresponding node (i.e., SN) for the radio bearer (i.e., MN terminated bearer).

On the other hand, under the current 3GPP specifications, an MN UL PDCP UP TNL Information IE is mandatory within the DRBs to Be Setup Item IE mentioned above. As described in Non-Patent Literature 2, the MN UL PDCP UP TNL Information IE refers to a UP Transport Parameters IE (Section 9.2.3.76 of Non-Patent Literature 2) and contains a UP Transport Layer Information IE and a Cell Group ID IE. Both the UP Transport Layer Information IE and the Cell Group ID IE are mandatory information elements. The UP Transport Layer Information IE indicates the MN endpoint of an Xn-U bearer for delivery of uplink (UL) PDCP PDUs for the MN terminated bearer. The Cell Group ID IE can be set to only the value "0" meaning MCG, or only the value "1" meaning SCG, or both the value "0" and the value "1". Accordingly, although it is not explicitly stated in the current 3GPP specifications, it is assumed that the Cell Group ID IE set to the value "0" means an MCG bearer, the Cell Group ID IE set to the value "1" means an SCG bearer, and the Cell Group ID IE set to both the value "0" and "1" means a split bearer.

However, inconsistency may occur between the above-mentioned Cell Group ID IE and the above-mentioned UL Configuration IE. For example, in the case of the setup of SCG resource for an MN terminated bearer described above, the UL Configuration IE may be set to the value "no data" while the Cell Group ID IE is set to the value "1". In other words, it could happen that the Cell Group ID IE implies that the MN terminated bearer is an SCG bearer, but the UL Configuration IE indicates that the UL of the SN is not used. According to the current 3GPP specifications, it is not clear how the SN understands these IEs in this case. This may lead to a situation where, in the worst case, the SN does not configure any UL resources for the UE and there is no uplink configuration for the MN terminated bearer, neither in the MN (MCG) nor in the SN (SCG).

The problem described above can also occur when the MN requests the SN to modify SCG resources for an MN terminated bearer. Similarly, this problem can also occur when the SN requests the MN to set up or modify MCG resources for an SN terminated bearer.

One of the objects to be attained by embodiments disclosed herein is to provide apparatuses, methods, and programs that contribute to solving the problems described above. It should be noted that this object is merely one of the objects to be attained by the embodiments disclosed herein. Other objects or problems and novel features will be made apparent from the following description and the accompanying drawings.

Solution to Problem

In a first aspect, a first RAN node includes at least one memory and at least one processor coupled to the at least one memory. The at least one processor is configured to receive from a second RAN node, in a control procedure for dual connectivity for a User Equipment (UE), a first message indicating a setup or modification of a radio bearer terminated at the second RAN node. The at least one processor is configured to reject the setup or modification of the radio bearer if a first IE in the first message indicates that the radio bearer will only use resources in a cell group of the first RAN node, and if a second IE in the first message indicates that the UE will not use an uplink of the first RAN node for the radio bearer.

In a second aspect, a method performed by a first RAN node includes the steps of:

(a) receiving from a second RAN node, in a control procedure for dual connectivity for a User Equipment (UE), a first message indicating a setup or modification of a radio bearer terminated at the second RAN node; and (b) rejecting the setup or modification of the radio bearer if a first IE in the first message indicates that the radio bearer will only use resources in a cell group of the first RAN node, and if a second IE in the first message indicates that the UE will not use an uplink of the first RAN node for the radio bearer.

In a third aspect, a first RAN node includes at least one memory and at least one processor coupled to the at least one memory. The at least one processor is configured to receive from a second RAN node, in a control procedure for dual connectivity for a User Equipment (UE), a first message indicating a setup or modification of a radio bearer terminated at the second RAN node. The at least one processor is configured to ignore a first IE contained in the first message with respect to an endpoint of the second RAN node in an inter-RAN node tunnel used for delivery of uplink PDUs if a second IE in the first message indicates that the UE will not use an uplink of the first RAN node for the radio bearer.

In a fourth aspect, a method performed by a first RAN node includes the steps of:

(a) receiving from a second RAN node, in a control procedure for dual connectivity for a User Equipment (UE), a first message indicating a setup or modification of a radio bearer terminated at the second RAN node; and (b) ignoring a first IE contained in the first message with respect to an endpoint of the second RAN node in an inter-RAN node tunnel used for delivery of uplink PDUs if a second IE in the first message indicates that the UE will not use an uplink of the first RAN node for the radio bearer.

In a fifth aspect, a RAN node, configured to act as an MN for dual connectivity for a UE, includes at least one memory and at least one processor coupled to the at least one memory. The at least one processor is configured to include, into a first message to be sent to an SN of the dual connectivity, a first IE regarding a radio bearer terminated at the MN. The at least one processor is configured to, on a condition that the first IE indicates that the radio bearer will use both resources in an MCG of the MN and resources in an SCG of the SN, include into the first message a second IE indicating how the UE will use an uplink of the SN for the radio bearer. The at least one processor is configured to send the first message to the SN.

In a sixth aspect, a method performed by a RAN node, configured to act as an MN for dual connectivity for a UE, includes the steps of:

(a) including, into a first message to be sent to an SN of the dual connectivity, a first IE regarding a radio bearer terminated at the MN;

(b) on a condition that the first IE indicates that the radio bearer will use both resources in an MCG of the MN and resources in an SCG of the SN, including into the first message a second IE indicating how the UE will use an uplink of the SN for the radio bearer; and (c) sending the first message to the SN.

In a seventh aspect, a RAN node, configured to act as an SN for dual connectivity for a UE, includes at least one memory and at least one processor coupled to the at least one memory. The at least one processor is configured to include, into a first message to be sent to an MN of the dual connectivity, a first IE regarding a radio bearer terminated at the SN. The at least one processor is configured to, on a condition that the first IE indicates that the radio bearer will use both resources in an MCG of the MN and resources in an SCG of the SN, include into the first message a second IE indicating how the UE will use an uplink of the MN for the radio bearer. The at least one processor is configured to send the first message to the MN.

In an eighth aspect, a method performed by a RAN node, configured to act as an SN for dual connectivity for a UE, includes the steps of:

(a) including, into a first message to be sent to an MN of the dual connectivity, a first IE regarding a radio bearer terminated at the SN;

(b) on a condition that the first IE indicates that the radio bearer will use both resources in an MCG of the MN and resources in an SCG of the SN, including into the first message a second IE indicating how the UE will use an uplink of the MN for the radio bearer; and (c) sending the first message to the MN.

In a ninth aspect, a program includes a set of instructions (software codes) that, when loaded into a computer, cause the computer to perform the method according to the second, fourth, sixth, or eighth aspect described above.

Advantageous Effects of Invention

According to the above-described aspects, it is possible to provide apparatuses, methods, and programs that contribute to solving the above-mentioned problems.

EXAMPLE EMBODIMENT

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on the 3GPP Long Term Evolution (LTE) system and fifth generation mobile communication system (5G system). More specifically, the embodiments will be described primarily for MR-DC with 5G Core (5GC). However, these embodiments may be applied to other radio communication systems that support technologies similar to the multi-connectivity (e.g., Dual Connectivity) in the 3GPP. The term LTE as used herein includes improvements and enhancements to LTE and LTE-Advanced to enable interworking with the 5G System, unless otherwise noted.

First Embodiment

Figure 1:
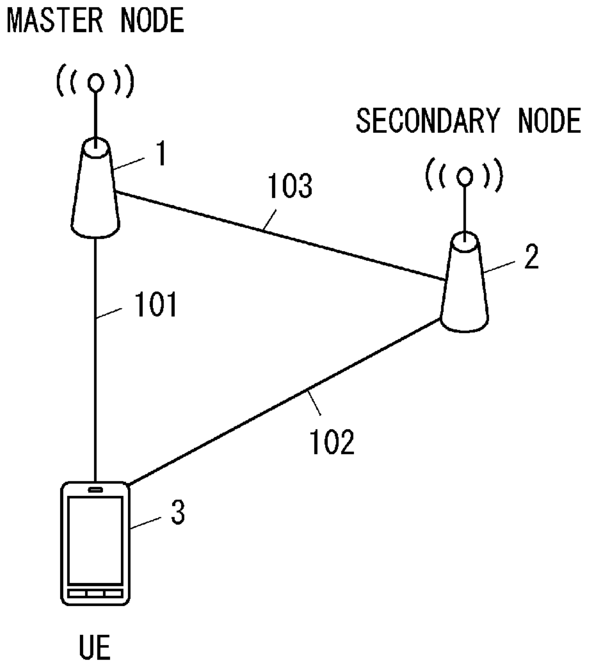
FIG. 1 shows an example configuration of a radio communication network according to an embodiment.

FIG. 1 shows an example configuration of a radio communication network according to a plurality of embodiments including this embodiment. In the example of FIG. 1, the radio communication network includes a RAN node 1, a RAN node 2, and a UE 3. Each element (or network function) shown in FIG. 1 can be implemented, for example, as a network element on dedicated hardware, as a software instance running on dedicated hardware, or as a virtualized function instantiated on an application platform.

Each of the RAN nodes 1 and 2 may be a Next Generation (NG) RAN node, more specifically a gNB or ng-eNB. The ng-eNB is a node that provides Evolved Universal Mobile Telecommunications System (UMTS) Terrestrial Radio Access (E-UTRA) user plane and control plane protocol terminations towards a UE and is connected to a 5GC via an NG interface. The Radio Access Technology (RAT) of the RAN node 1 may be different from that of the RAN node 2.

The RAN node 1 may be a Central Unit (e.g., ng-eNB-CU or gNB-CU) in a cloud RAN (C-RAN) deployment, or a combination of a CU and one or more Distributed Units (e.g., ng-eNB-DUs or gNB-DUs). The C-RAN is also referred to as CU/DU split. The CU may include a Control Plane (CP) Unit (e.g., gNB-CU-CP) and one or more User Plane (UP) Units (e.g., gNB-CU-UPs). Accordingly, the RAN node 1 may be a CU-CP or a combination of a CU-CP and a CU-UP(s). Similarly, the RAN node 2 may be a Central Unit (CU) or a combination of a CU and one or more Distributed Units (DUs). The RAN node 2 may be a CU-CP or a combination of a CU-CP and a CU-UP(s).

The RAN node 1 and the RAN node 2 communicate with each other via an inter-node interface (i.e., Xn interface) 103. The RAN node 1 and the RAN node 2 operate as an MN and an SN in dual connectivity, respectively. The UE 3 communicates with the MN 1 and the SN 2 via air interfaces 101 and 102 and performs dual connectivity between the MCG associated with the MN 1 and the SCG associated with the SN 2.

This dual connectivity may be Multi-Radio Dual Connectivity (MR-DC). More specifically, the dual connectivity may be MR-DC with 5GC. The MR-DC with 5GC includes NG-RAN E-UTRA-NR Dual Connectivity (NGEN-DC), NR-E-UTRA Dual Connectivity (NE-DC), and NR-NR Dual Connectivity (NR-DC). Accordingly, the MN 1 may be either a master ng-eNB (in NGEN-DC) and a master gNB (in NR-DC and NE-DC). Similarly, the SN 2 may be either a secondary ng-eNB (in NE-DC) and a secondary gNB (in NR-DC and NGEN-DC). In NGEN-DC, the UE 3 is connected to an ng-eNB acting as the MN 1 and to a gNB acting as the SN 2. In NE-DC, the UE 3 is connected to a gNB acting as the MN 1 and to an ng-eNB acting as the SN 2. In NR-DC, the UE 3 is connected to one gNB (or gNB-DU) acting as the MN 1 and to another gNB (or gNB-DU) acting as the SN 2.

The MCG is a group of serving cells associated with (or provided by) the MN 1. The MCG includes the SpCell (i.e., Primary Cell (PCell)) and optionally one or more Secondary Cells (SCells). Meanwhile, the SCG is a group of serving cells associated with (or provided by) the SN 2. The SCG includes the Primary Cell of the SCG (i.e., Primary SCG Cell (PSCell)) and optionally one or more Secondary Cells (SCells). The PSCell is the Special Cell (SpCell) of the SCG and supports Physical Uplink Control Channel (PUCCH) transmission and contention-based Random Access.

Figure 2:
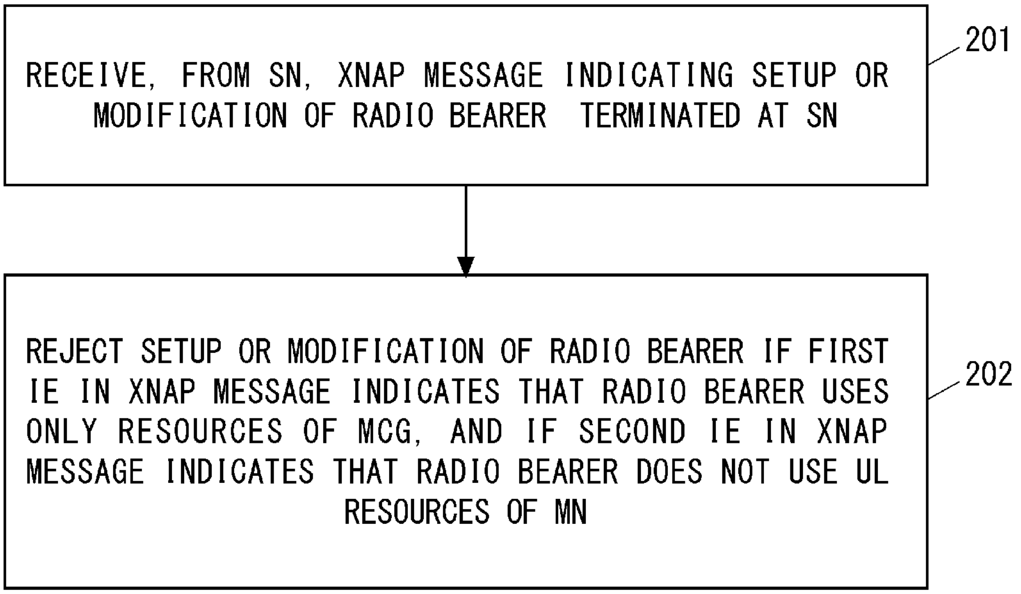
FIG. 2 is a flowchart showing an example of the operation of an MN according to an embodiment.

The following describes examples of the operations of the MN 1 and the SN 2 according to this embodiment. FIG. 2 shows an example of the operation of the MN 1. In step 201, the MN 1 receives from the SN 2 an XnAP message indicating the setup or modification of a radio bearer (SN terminated bearer) terminated at the SN 2. The XnAP message may request the MN 1 to add (or set up) or modify resources of the MN 1 for the SN terminated bearer. The XnAP message may request the MN 1 to prepare resources of the MN 1 for the SN terminated bearer or to prepare modifications of such resources. The XnAP message may be an SN ADDITION REQUEST ACKNOWLEDGE message, an SN MODIFICATION REQUEST ACKNOWLEDGE message, or an SN MODIFICATION REQUIRED message. In step 202, the MN 1 rejects the setup or modification of the radio bearer (i.e., SN terminated bearer) if a first IE in the XnAP message indicates that the radio bearer uses only resources of the MCG, and if a second IE in the XnAP message indicates that the radio bearer does not use UL resources of the MN 1. In other words, the MN 1 does not admit the setup or modification of MN resources or MCG resources or both for the radio bearer.

In some implementations, the first IE may be a Cell Group ID IE contained in an SN UL PDCP UP TNL Information IE contained in a DRBs to Be Setup Item IE (or DRBs to Be Modified Item IE) associated with the radio bearer (i.e., SN terminated bearer). As described in Non-Patent Literature 2, the SN UL PDCP UP TNL Information IE refers to a UP Transport Parameters IE (Section 9.2.3.76 in Non-Patent Literature 2) and contains a UP Transport Layer Information IE and a Cell Group ID IE. The Cell Group ID IE can be set to only the value "0" meaning MCG, or only the value "1" meaning SCG, or both the value "0" and the value "1". If the Cell Group ID IE is only set to the value "0", this may indicate that the radio bearer uses only resources of the MCG.

Meanwhile, the second IE may be a UL Configuration IE contained in that DRBs to Be Setup Item IE (or DRBs to Be Modified Item IE). This UL Configuration IE indicates how the UE 3 will use the uplink of the corresponding RAN node (i.e., MN 1) for that radio bearer (i.e., SN terminated bearer). More specifically, the UL Configuration IE can be set to the value "no data", the value "shared", or the value "only". The value "no data" means that the UE 3 does not use the uplink of the corresponding node (i.e., MN 1) for that radio bearer (i.e., SN terminated bearer). The value "shared" means that the UE 3 uses both the uplink of the corresponding node (i.e., MN 1) and the uplink of the other node (i.e., SN 2) for the radio bearer (i.e., SN terminated bearer). The value "only" means that the UE 3 uses only the uplink of the corresponding node (i.e., MN 1) for the radio bearer (i.e., SN terminated bearer).

In some implementations, the MN 1 may act as follows to reject the setup or modification of the radio bearer in question (i.e., SN terminated bearer). After receiving an SN ADDITION REQUEST ACKNOWLEDGE (or SN MODIFICATION REQUEST ACKNOWLEDGE) message from the SN 2, the MN 1 may initiate an SN Release procedure to release the SN 2 (or to stop dual connectivity). Alternatively, after receiving a SN ADDITION REQUEST ACKNOWLEDGE (or SN MODIFICATION REQUEST ACKNOWLEDGE) message from the SN 2, the MN 1 may initiate an SN Modification procedure to request the SN 2 to release the radio bearer. Alternatively, in response to receiving an SN MODIFICATION REQUIRED message from the SN 2, the MN 1 may send a SN MODIFICATION REFUSE message to the SN 2 indicating that the entire requested modification is not acceptable. Alternatively, in response to receiving an SN MODIFICATION REQUIRED message from the SN 2, the MN 1 may send an SN MODIFICATION CONFIRM message to the SN 2 indicating that modification of the MN resources for the radio bearer is not acceptable.

Figure 3:
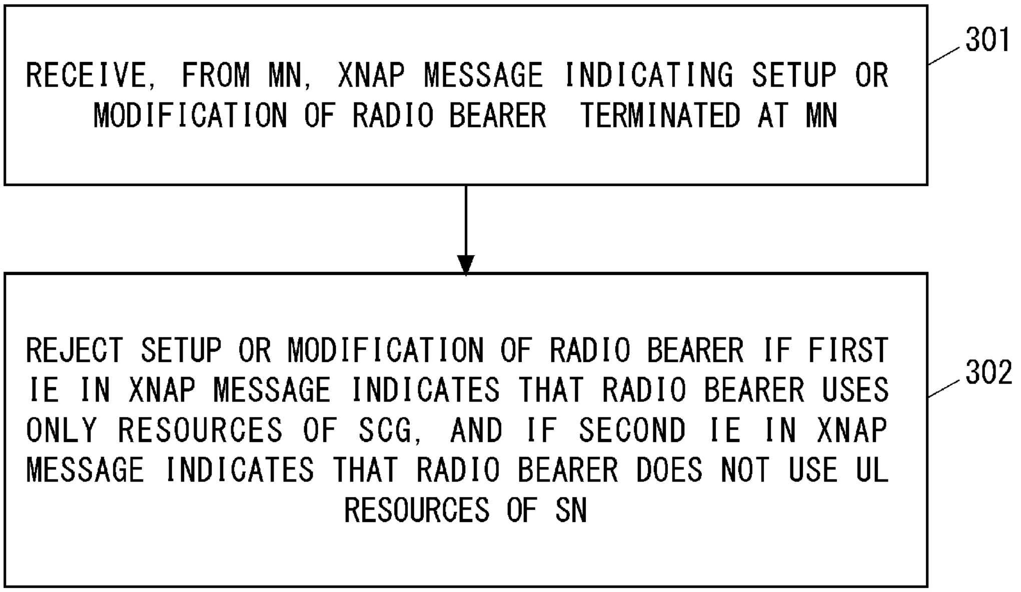
FIG. 3 is a flowchart showing an example of the operation of an SN according to an embodiment.

FIG. 3 shows an example of the operation of the SN 2. In step 301, the SN 2 receives from the MN 1 an XnAP message indicating the setup or modification of a radio bearer (MN terminated bearer) terminated at the MN 1. The XnAP message may request the SN 2 to add (or set up) or modify resources of the SN 2 for the MN terminated bearer. The XnAP message may request the SN 2 to prepare resources of the SN 2 for the MN terminated bearer or to prepare modifications of such resources. The XnAP message may be an SN ADDITION REQUEST message or an SN MODIFICATION REQUEST message. In step 302, the SN 2 rejects the setup or modification of the radio bearer (i.e., MN terminated bearer) if a first IE in the XnAP message indicates that the radio bearer uses only resources of the SCG, and if a second IE in the XnAP message indicates that the radio bearer does not use UL resources of the SN 2. In other words, the SN 2 does not admit the setup or modification of SN resources or SCG resources or both for the radio bearer.

In some implementations, the first IE may be a Cell Group ID IE contained in an MN UL PDCP UP TNL Information IE contained in a DRBs to Be Setup Item IE (or DRBs to Be Modified Item IE) associated with the radio bearer (i.e., MN terminated bearer). As described in Non-Patent Literature 2, the MN UL PDCP UP TNL Information IE refers to a UP Transport Parameters IE (Section 9.2.3.76 in Non-Patent Literature 2) and contains a UP Transport Layer Information IE and a Cell Group ID IE. The Cell Group ID IE can be set to only the value "0" meaning MCG, or only the value "1" meaning SCG, or both the value "0" and the value "1". If the Cell Group ID IE is only set to the value "1", this may indicate that the radio bearer uses only resources of the SCG.

Meanwhile, the second IE may be a UL Configuration IE contained in that DRBs to Be Setup Item IE (or DRBs to Be Modified Item IE). This UL Configuration IE indicates how the UE 3 will use the uplink of the corresponding RAN node (i.e., SN 2) for that radio bearer (i.e., MN terminated bearer). More specifically, the UL Configuration IE can be set to the value "no data", the value "shared", or the value "only". The value "no data" means that the UE 3 does not use the uplink of the corresponding node (i.e., SN 2) for that radio bearer (i.e., MN terminated bearer). The value "shared" means that the UE 3 uses both the uplink of the corresponding node (i.e., SN 2) and the uplink of the other node (i.e., MN 1) for the radio bearer (i.e., MN terminated bearer). The value "only" means that the UE 3 uses only the uplink of the corresponding node (i.e., SN 2) for the radio bearer (i.e., MN terminated bearer).

In some implementations, the SN 2 may act as follows to reject the setup or modification of the radio bearer in question (i.e., MN terminated bearer). In response to receiving an SN ADDITION REQUEST (or SN MODIFICATION REQUEST) message from the MN 1, the SN 2 may send an SN ADDITION REQUEST REJECT (or SN MODIFICATION REQUEST REJECT) message to the MN 1. In other words, the SN 2 may reject the entire requested SN addition procedure (or SN modification procedure). Alternatively, in response to receiving an SN ADDITION REQUEST (or SN MODIFICATION REQUEST) message from the MN 1, the SN 2 may send an SN ADDITION REQUEST ACKNOWLEDGE (or SN MODIFICATION REQUEST ACKNOWLEDGE) message to the MN 1 indicating that the SN resource setup or modification for the radio bearer is not acceptable.

Figure 4:
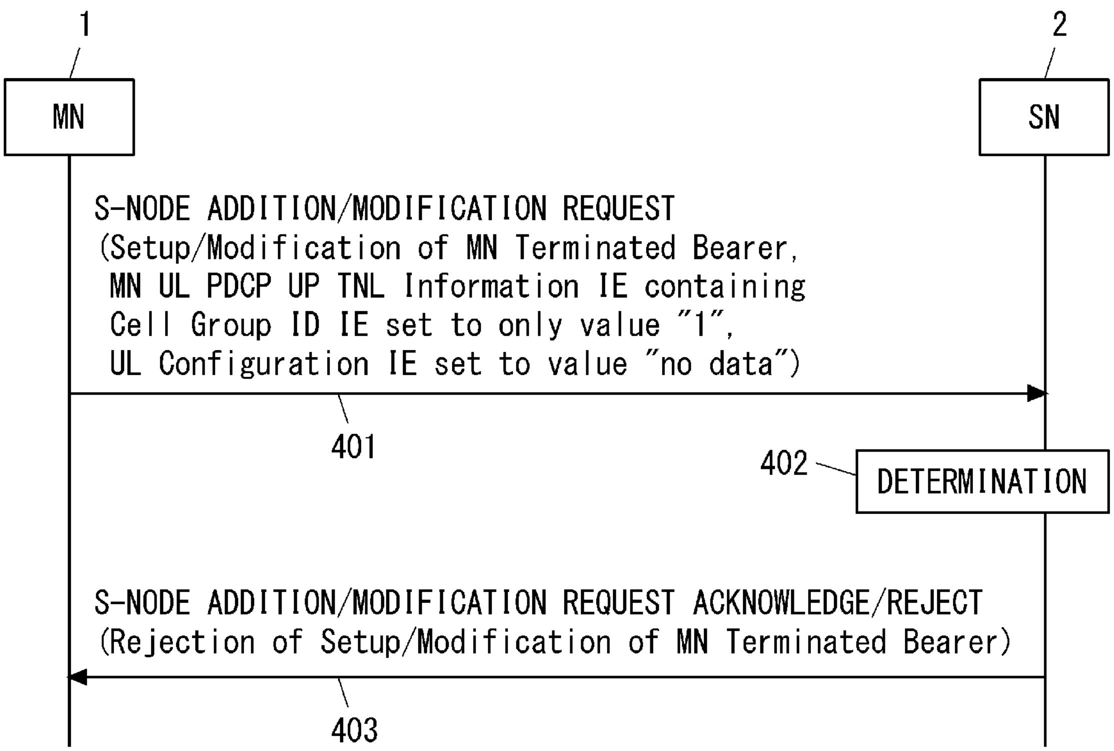
FIG. 4 is a sequence diagram showing an example of signaling according to an embodiment.

The following describes specific examples of the operations of MN 1 and SN 2 described using FIGS. 2 and 3. The signaling shown in FIG. 4 relates to an SN addition procedure and an SN modification procedure. This SN addition procedure is an S-NG-RAN node Addition Preparation procedure. This SN modification procedure is an M-NG-RAN node initiated S-NG-RAN node Modification Preparation procedure.

In step 401, the MN 1 sends an S-NODE ADDITION REQUEST message to the SN 2. The S-NODE ADDITION REQUEST message informs the SN 2 of the setup of an MN terminated bearer with respect to a PDU Session of the UE 3. In other words, the S-NODE ADDITION REQUEST message requests the SN 2 to add or set up SN resources for an MN terminated bearer. More specifically, the S-NODE ADDITION REQUEST message contains a PDU Session Resources To Be Added Item IE regarding the PDU Session in question. The PDU Session Resources To Be Added Item IE contains a PDU Session Resource Setup Info—MN terminated IE. The PDU Session Resource Setup Info—MN terminated IE contains a DRBs to Be Setup Item IE regarding the MN terminated bearer. The DRBs to Be Setup Item IE contains an MN UL PDCP UP TNL Information IE containing a Cell Group ID IE, and also contains a UL Configuration IE. In the example in FIG. 4, the Cell Group ID IE is set to only the value "1", which implies that the MN terminated bearer is an SCG bearer. On the other hand, the UL Configuration IE is set to the value "no data", which indicates that the uplink of the SN 2 is not used for the MN terminated bearer.

In step 401, the MN 1 may instead send an S-NODE MODIFICATION REQUEST message to the SN 2. The S-NODE MODIFICATION REQUEST message informs the SN 2 of the setup or modification of an MN terminated bearer with respect to a PDU Session of the UE 3. In other words, the S-NODE MODIFICATION REQUEST message requests the SN 2 to add (or set up) or modify SN resources for an MN terminated bearer. More specifically, the S-NODE MODIFICATION REQUEST message may contain a PDU Session Resources To Be Added Item IE regarding the setup of the PDU Session in question. The PDU Session Resources To Be Added Item IE contains a PDU Session Resource Setup Info—MN terminated IE. Alternatively, the S-NODE MODIFICATION REQUEST message may contain a PDU Session Resources To Be Modified Item IE regarding the modification of the PDU Session in question. The PDU Session Resources To Be Modified Item IE contains a PDU Session Resource Modification Info—MN terminated IE. The PDU Session Resource Setup Info—MN terminated IE (or PDU Session Resource Modification Info—MN terminated IE) contains a DRBs to Be Setup Item IE (or DRBs to Be Modified Item IE) pertaining to the MN terminated bearer. The DRBs to Be Setup Item IE (or DRBs to Be Modified Item IE) contains an MN UL PDCP UP TNL Information IE containing a Cell Group ID IE, and also contains a UL Configuration IE. In the example in FIG. 4, the Cell Group ID IE is set to only the value "1", which implies that the MN terminated bearer is an SCG bearer. On the other hand, the UL Configuration IE is set to the value "no data", which indicates that the uplink of the SN 2 is not used for the MN terminated bearer.

In step 402, the SN 2 determines whether to accept or reject the requested setup or modification of SN resources for the MN terminated bearer. In the example in FIG. 4, the SN 2 recognizes that the UL Configuration IE within the DRBs to Be Setup Item IE (or DRBs to Be Modified Item IE) regarding the MN terminated bearer in question is set to the value "no data", and that the Cell Group ID IE contained in the MN UL PDCP UP TNL Information IE within that DRBs to Be Setup Item IE (or DRBs to Be Modified Item IE) is set to only the value "1", meaning SCG. In response, the SN 2 decides to reject (or not admit) the setup or modification of SN resources for this MN terminated bearer.

In step 403, the SN 2 informs the MN 1 of its rejection of the requested MN terminated bearer setup or modification. As already described, the SN 2 may reject the entire S-NG-RAN node Addition Preparation procedure. In this case, the SN 2 may send an S-NODE ADDITION REQUEST REJECT message to the MN 1. A Cause IE contained in the S-NODE ADDITION REQUEST REJECT message may indicate, for example but not limited to, "invalid bearer Option configuration", "Invalid UL configuration", "Invalid UL resource configuration", or "Bearer Option not Valid". Alternatively, the SN 2 may selectively reject the setup of SN resources for the MN terminated bearer in question. In this case, the SN 2 may send to the MN 1 an S-NODE ADDITION REQUEST ACKNOWLEDGE message containing a PDU Session Resource Setup Response Info—MN terminated IE indicating that the setup of the MN terminated bearer is not acceptable. This PDU Session Resource Setup Response Info—MN terminated IE contains a DRBs Not Admitted To Be Setup or Modified List IE that includes the Data Radio Bearer (DRB) ID of the MN terminated bearer. The DRBs Not Admitted To Be Setup or Modified List IE may include a Cause IE associated with the MN terminated bearer. This Cause IE may indicate, for example but not limited to, "invalid bearer Option configuration", "Invalid UL configuration", "Invalid UL resource configuration", or "Bearer Option not Valid".

Alternatively, in step 403, the SN 2 may reject the entire S-NG-RAN node Modification Preparation procedure. In this case, the SN 2 may send an S-NODE MODIFICATION REQUEST REJECT message to the MN 1. A Cause IE contained in the S-NODE MODIFICATION REQUEST REJECT message may indicate, for example but not limited to, "invalid bearer Option configuration", "Invalid UL configuration", "Invalid UL resource configuration", or "Bearer Option not Valid". Alternatively, the SN 2 may selectively reject the setup or modification of SN resources for the MN terminated bearer in question. In this case, the SN 2 may send to the MN 1 an S-NODE MODIFICATION REQUEST ACKNOWLEDGE message containing a PDU Session Resource Setup Response Info—MN terminated IE (or PDU Session Resource Modification Response Info—MN terminated IE) indicating that the setup or modification of the MN terminated bearer is not acceptable. This PDU Session Resource Setup Response Info—MN terminated IE (or PDU Session Resource Modification Response Info—MN terminated IE) contains a DRBs Not Admitted To Be Setup or Modified List IE that includes the DRB ID of the MN terminated bearer. The DRBs Not Admitted To Be Setup or Modified List IE may include a Cause IE associated with the MN terminated bearer. This Cause IE may indicate, for example but not limited to, "invalid bearer Option configuration", "Invalid UL configuration", "Invalid UL resource configuration", or "Bearer Option not Valid".

Figure 5:
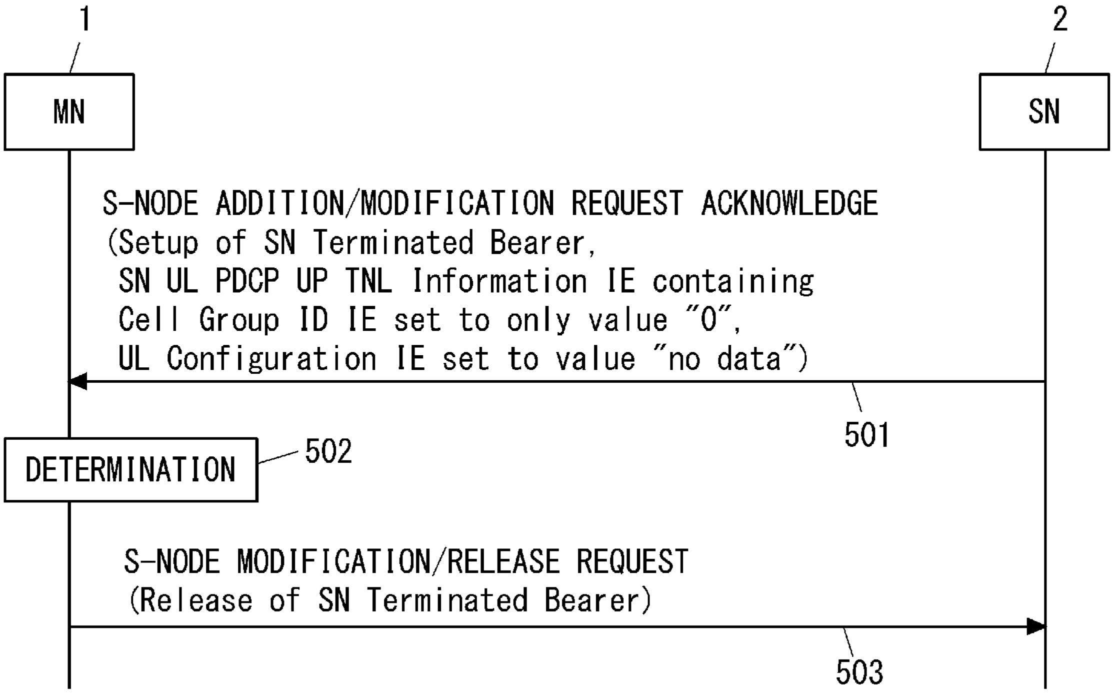
FIG. 5 is a sequence diagram showing an example of signaling according to an embodiment.

The signaling shown in FIG. 5 relates to an SN addition procedure and an SN modification procedure. This SN addition procedure is an S-NG-RAN node Addition Preparation procedure. This SN modification procedure is an M-NG-RAN node initiated S-NG-RAN node Modification Preparation procedure.

In step 501, the SN 2 sends an S-NODE ADDITION REQUEST ACKNOWLEDGE message to the MN 1. The S-NODE ADDITION REQUEST ACKNOWLEDGE message informs the MN 1 of the setup of an SN terminated bearer for a PDU Session of the UE 3. In other words, the S-NODE ADDITION REQUEST ACKNOWLEDGE message requests the MN 1 to add or set up MN resources for an SN terminated bearer. More specifically, the S-NODE ADDITION REQUEST ACKNOWLEDGE message contains a PDU Session Resources Admitted To Be Added Item IE for the PDU Session in question. The PDU Session Resources Admitted To Be Added Item IE contains a PDU Session Resource Setup Response Info—SN terminated IE. The PDU Session Resource Setup Response Info—SN terminated IE contains an SN UL PDCP UP TNL Information IE containing a Cell Group ID IE, and also contains a UL Configuration IE. In the example in FIG. 5, the Cell Group ID IE is set to only the value "0", which implies that the SN terminated bearer is an MCG bearer. On the other hand, the UL Configuration IE is set to the value "no data", which indicates that the uplink of the MN 1 is not used for the SN terminated bearer.

In step 501, SN 2 may instead send an S-NODE MODIFICATION REQUEST ACKNOWLEDGE message to the MN 1. The S-NODE MODIFICATION REQUEST ACKNOWLEDGE message informs the MN 1 of the setup of an SN terminated bearer with respect to a PDU Session of the UE 3. In other words, the S-NODE MODIFICATION REQUEST ACKNOWLEDGE message requests the MN 1 to add or set up MN resources for an SN terminated bearer. More specifically, the S-NODE MODIFICATION REQUEST ACKNOWLEDGE message may contain a PDU Session Resources Admitted To Be Added Item IE regarding the setup of the PDU Session in question. The PDU Session Resources Admitted To Be Added Item IE contains a PDU Session Resource Setup Response Info—SN terminated IE. Alternatively, the S-NODE MODIFICATION REQUEST ACKNOWLEDGE message may contain a PDU Session Resources Admitted To Be Modified Item IE regarding the modification of the PDU Session in question. The PDU Session Resources Admitted To Be Modified Item IE contains a PDU Session Resource Modification Response Info—SN terminated IE. The PDU Session Resource Setup Response Info—SN terminated IE (or PDU Session Resource Modification Response Info—SN terminated IE) contains a DRBs to Be Setup Item IE pertaining to the SN terminated bearer. The DRBs to Be Setup Item IE contains an SN UL PDCP UP TNL Information IE containing a Cell Group ID IE, and also contains a UL Configuration IE. In the example in FIG. 5, the Cell Group ID IE is set to only the value "0", which implies that the SN terminated bearer is an MCG bearer. On the other hand, the UL Configuration IE is set to the value "no data", which indicates that the uplink of the MN 1 is not used for the SN terminated bearer.

In step 502, the MN 1 determines whether to accept or reject the requested setup of MN resources for the SN terminated bearer. In the example in FIG. 5, the MN 1 recognizes that the UL Configuration IE in the DRBs to Be Setup Item IE regarding the SN terminated bearer in question is set to the value "no data", and that the Cell Group ID IE contained in the MN UL PDCP UP TNL Information IE within that DRBs to Be Setup Item IE is set to only the value "0", meaning MCG. In response, the MN 1 decides to reject (or not admit) the setup of MN resources for this SN terminated bearer.

In step 503, the MN 1 informs the SN 2 of its rejection of the requested SN terminated bearer setup. As already described, the MN 1 may initiate an M-NG-RAN node initiated S-NG-RAN node Release procedure to release the SN 2 (or to stop dual connectivity). Specifically, the MN 1 may send an S-NODE RELEASE REQUEST message to the SN 2. Alternatively, the MN 1 may selectively reject the setup of MN resources for the SN terminated bearer in question. In this case, the MN 1 may initiate an M-NG-RAN node initiated S-NG-RAN node Modification Preparation procedure to request the SN 2 to release the SN terminated bearer. Specifically, the MN 1 may send an S-NODE MODIFICATION REQUEST message to the SN 2. The S-NODE MODIFICATION REQUEST message contains a PDU Session Resource Modification Info—SN terminated IE containing a DRBs To Be Released List IE that indicates the DRB ID of the SN terminated bearer.

Figure 6:
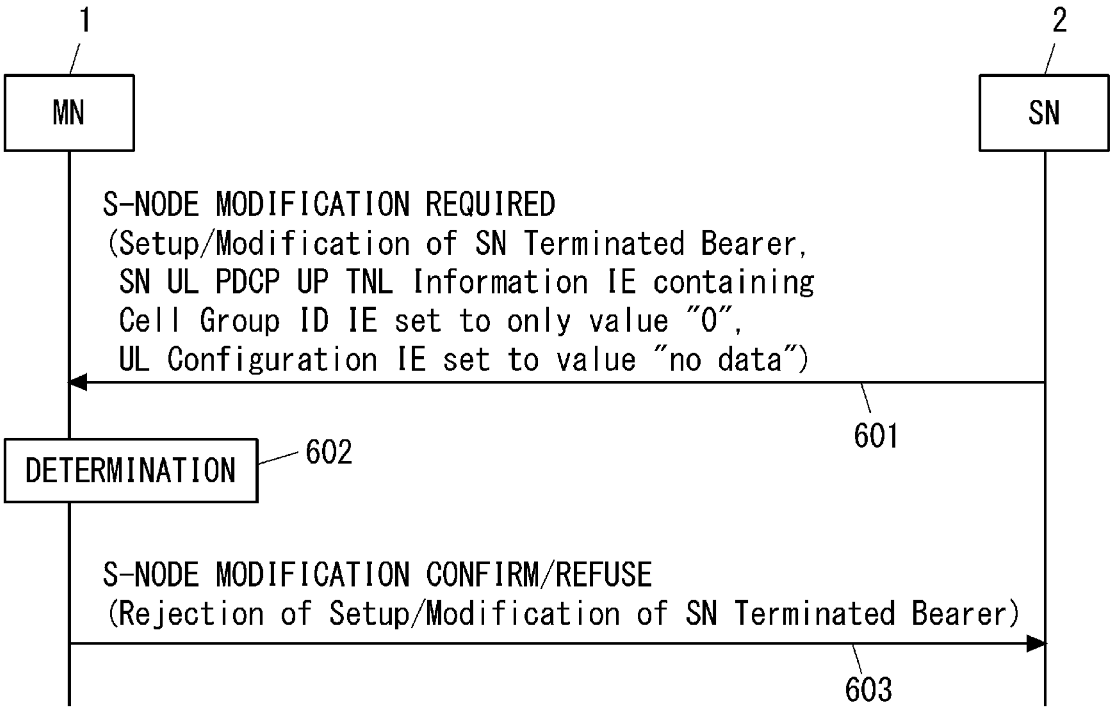
FIG. 6 is a sequence diagram showing an example of signaling according to an embodiment.

The signaling shown in FIG. 6 relates to an SN modification procedure. This SN modification procedure is an S-NG-RAN node initiated S-NG-RAN node Modification procedure.

In step 601, the SN 2 sends an S-NODE MODIFICATION REQUIRED message to the MN 1. The S-NODE MODIFICATION REQUIRED message informs the MN 1 of the setup or modification of an SN terminated bearer with respect to a PDU Session of the UE 3. In other words, the S-NODE MODIFICATION REQUIRED message requests the MN 1 to add (or set up) or modify MN resources for an SN terminated bearer. More specifically, the S-NODE MODIFICATION REQUIRED message may contain a PDU Session Resources To Be Modified Item IE regarding the modification of the PDU Session in question. The PDU Session Resources To Be Modified Item IE contains a PDU Session Resource Modification Required Info—SN terminated IE. The PDU Session Resource Modification Required Info—SN terminated IE contains a DRBs to Be Setup Item IE (or DRBs to Be Modified Item IE) regarding the SN terminated bearer. The DRBs to Be Setup Item IE (or DRBs to Be Modified Item IE) contains an SN UL PDCP UP TNL Information IE containing a Cell Group ID IE, and also contains a UL Configuration IE. In the example in FIG. 6, the Cell Group ID IE is set to only the value "0", which implies that the SN terminated bearer is an MCG bearer. On the other hand, the UL Configuration IE is set to the value "no data", which indicates that the uplink of the MN 1 is not used for the SN terminated bearer.

In step 602, the MN 1 determines whether to accept or reject the requested setup or modification of MN resources for the SN terminated bearer. In the example in FIG. 6, the MN 1 recognizes that the UL Configuration IE in the DRBs to Be Setup Item IE (or DRBs to Be Modified Item IE) regarding the SN terminated bearer in question is set to the value "no data", and that the Cell Group ID IE contained in the SN UL PDCP UP TNL Information IE within that DRBs to Be Setup Item IE (or DRBs to Be Modified Item IE) is set to only the value "0", meaning MCG. In response, the MN 1 decides to reject (or not admit) the setup or modification of MN resources for this SN terminated bearer.

In step 603, the MN 1 notifies the SN 2 of its rejection of the requested SN terminated bearer setup or modification. As already described, the MN 1 may reject the entire S-NG-RAN node initiated S-NG-RAN node Modification procedure. In this case, the MN 1 may send an S-NODE MODIFICATION REFUSE message to the SN 2. A Cause IE in the S-NODE MODIFICATION REFUSE message may indicate, for example but not limited to, "invalid bearer Option configuration", "Invalid UL configuration", "Invalid UL resource configuration", or "Bearer Option not Valid". Alternatively, the MN 1 may selectively reject the setup or modification of SN resources for the SN terminated bearer in question. In this case, the MN 1 may send to the SN 2 a S-NODE MODIFICATION CONFIRM message containing a PDU Session Resource Modification Confirm Info—SN terminated IE indicating that the setup or modification of the SN terminated bearer in question is not acceptable. The PDU Session Resource Modification Confirm Info—SN terminated IE contains a DRBs Not Admitted To Be Setup or Modified List IE that includes the DRB ID of the SN terminated bearer. The DRBs Not Admitted To Be Setup or Modified List IE may include a Cause IE associated with the SN terminated bearer. This Cause IE may indicate, for example but not limited to, "invalid bearer Option configuration", "Invalid UL configuration", "Invalid UL resource configuration", or "Bearer Option not Valid".

According to the operation of the MN 1 described in this embodiment, if there is inconsistency between the Cell Group ID IE and the UL Configuration IE received from the SN 2 for setting up or modifying MN resources for an SN terminated bearer, then the MN 1 can reject the setup or modification of MN resources for that SN terminated bearer. This helps to avoid a situation where neither the MN (MCG) nor the SN (SCG) has an uplink configuration for the SN terminated bearer. Similarly, according to the operation of the SN 2 described in this embodiment, if there is inconsistency between the Cell Group ID IE and the UL Configuration IE received from the MN 1 for setting up or modifying SN resources for an MN terminated bearer, then the SN 2 can reject the setup or modification of SN resources for that MN terminated bearer. This helps to avoid a situation where there is no uplink configuration for the MN terminated bearer either in the MN (MCG) or in the SN (SCG).

Second Embodiment

A configuration example of a radio communication network according to this embodiment is the same as the example shown in FIG. 1. This embodiment provides other examples of the operations of the MN 1 and the SN 2.

Figure 7:
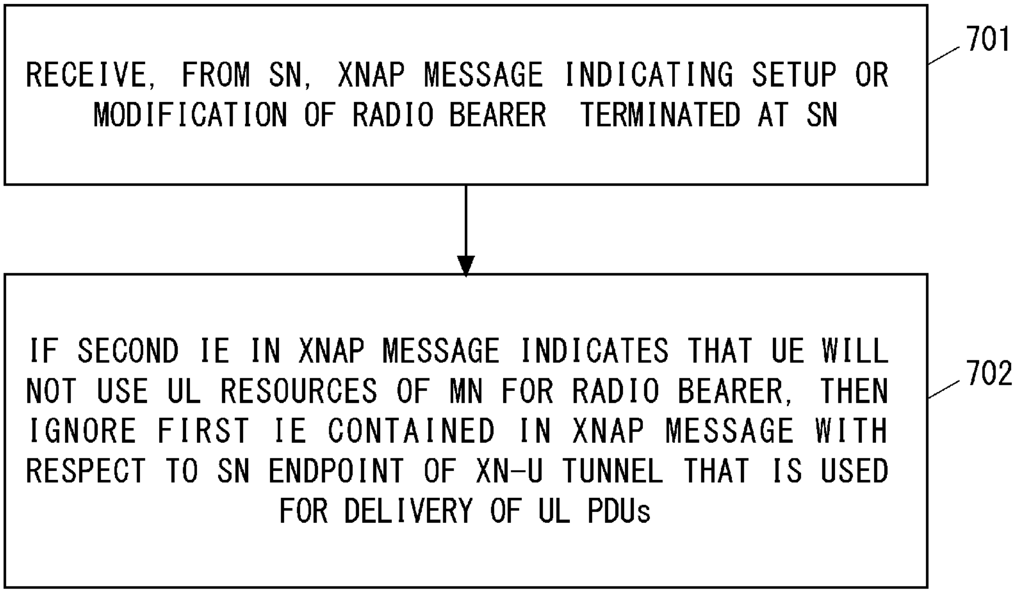
FIG. 7 is a flowchart showing an example of the operation of an MN according to an embodiment.

FIG. 7 shows an example of the operation of the MN 1. In step 701, the MN 1 receives from the SN 2 an XnAP message indicating the setup or modification of a radio bearer (SN terminated bearer) terminated at the SN 2. The XnAP message may request the MN 1 to add (or set up) or modify resources of the MN 1 for the SN terminated bearer. The XnAP message may request the MN 1 to prepare resources of the MN 1 for the SN terminated bearer or to prepare modifications of such resources. The XnAP message may be an SN ADDITION REQUEST ACKNOWLEDGE message, an SN MODIFICATION REQUEST ACKNOWLEDGE message, or an SN MODIFICATION REQUIRED message. In step 702, the MN 1 ignores a first IE contained in the XnAP message with respect to the SN endpoint of an Xn-U tunnel that is used for the delivery of UL PDUs, if a second IE in the XnAP message indicates that the radio bearer (i.e., SN terminated bearer) in question will not use the UL resources of the MN 1. In other words, the MN 1 ignores the SN endpoint information (SN UL Transport Layer information) indicated by the first IE. Accordingly, the MN 1 may not use the SN endpoint information. The MN 1 may discard the SN endpoint information. The MN 1 may omit (or skip) the preparation or setting of the delivery of UL PDUs destined for that SN endpoint.

In some implementations, the first IE may be an SN UL PDCP UP TNL Information IE contained in a DRBs to Be Setup Item IE (or DRBs to Be Modified Item IE) associated with the radio bearer (i.e., SN terminated bearer). Alternatively, the first IE may be a UP Transport Layer Information IE contained in the SN UL PDCP UP TNL Information IE.

Meanwhile, the second IE may be a UL Configuration IE contained in that DRBs to Be Setup Item IE (or DRBs to Be Modified Item IE). This UL Configuration IE indicates how the UE 3 will use the uplink of the corresponding RAN node (i.e., MN 1) for that radio bearer (i.e., SN terminated bearer). More specifically, the UL Configuration IE can be set to the value "no data", the value "shared", or the value "only". The value "no data" means that the UE 3 does not use the uplink of the corresponding node (i.e., MN 1) for that radio bearer (i.e., SN terminated bearer). The value "shared" means that the UE 3 uses both the uplink of the corresponding node (i.e., MN 1) and the uplink of the other node (i.e., SN 2) for the radio bearer (i.e., SN terminated bearer). The value "only" means that the UE 3 uses only the uplink of the corresponding node (i.e., MN 1) for the radio bearer (i.e., SN terminated bearer).

Figure 8:
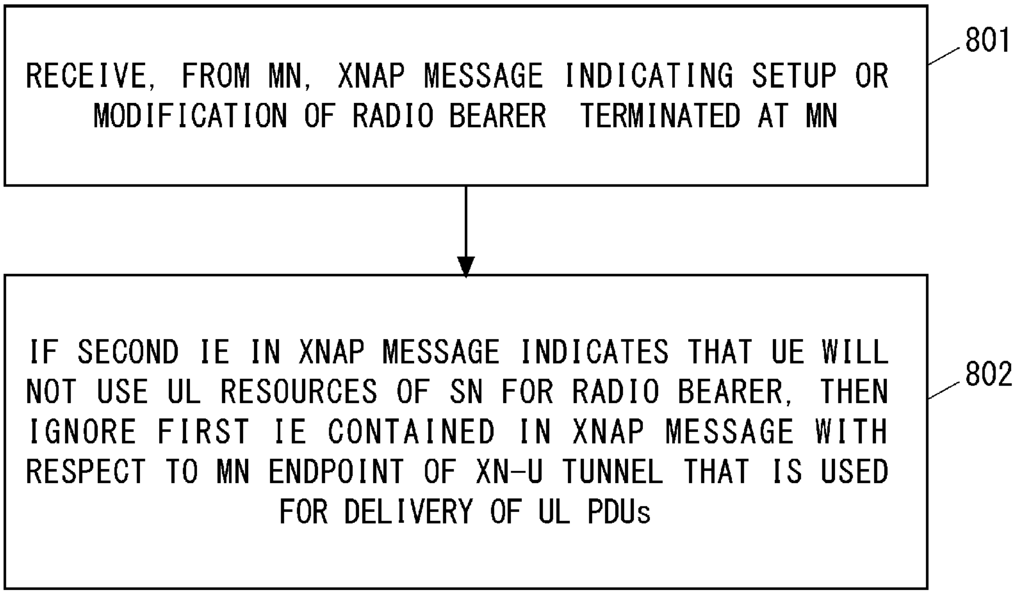
FIG. 8 is a flowchart showing an example of the operation of an SN according to an embodiment.

FIG. 8 shows an example of the operation of the SN 2. In step 801, the SN 2 receives from the MN 1 an XnAP message indicating the setup or modification of a radio bearer (MN terminated bearer) terminated at the MN 1. The XnAP message may request the SN 2 to add (or set up) or modify resources of the SN 2 for the MN terminated bearer. The XnAP message may request the SN 2 to prepare resources of the SN 2 for the MN terminated bearer or to prepare modifications of such resources. The XnAP message may be an SN ADDITION REQUEST message or an SN MODIFICATION REQUEST message. In step 802, the SN 2 ignores a first IE contained in the XnAP message with respect to the MN endpoint of an Xn-U tunnel used for the delivery of UL PDUs, if a second IE in the XnAP message indicates that the radio bearer (i.e., MN terminated bearer) does not use UL resources of the SN 2. Accordingly, the SN 2 may not use the MN endpoint information. The SN 2 may discard the MN endpoint information. The SN 2 may omit (or skip) the preparation or setting of the delivery of UL PDUs destined for that MN endpoint.

In some implementations, the first IE may be an MN UL PDCP UP TNL Information IE contained in a DRBs to Be Setup Item IE (or DRBs to Be Modified Item IE) associated with the radio bearer (i.e., MN terminated bearer). Alternatively, the first IE may be a UP Transport Layer Information IE contained in the MN UL PDCP UP TNL Information IE.

Meanwhile, the second IE may be a UL Configuration IE contained in that DRBs to Be Setup Item IE (or DRBs to Be Modified Item IE). This UL Configuration IE indicates how the UE 3 will use the uplink of the corresponding RAN node (i.e., SN 2) for that radio bearer (i.e., MN terminated bearer). More specifically, the UL Configuration IE can be set to the value "no data", the value "shared", or the value "only". The value "no data" means that the UE 3 does not use the uplink of the corresponding node (i.e., SN 2) for that radio bearer (i.e., MN terminated bearer). The value "shared" means that the UE 3 uses both the uplink of the corresponding node (i.e., SN 2) and the uplink of the other node (i.e., MN 1) for the radio bearer (i.e., MN terminated bearer). The value "only" means that the UE 3 uses only the uplink of the corresponding node (i.e., SN 2) for the radio bearer (i.e., MN terminated bearer).

Figure 9:
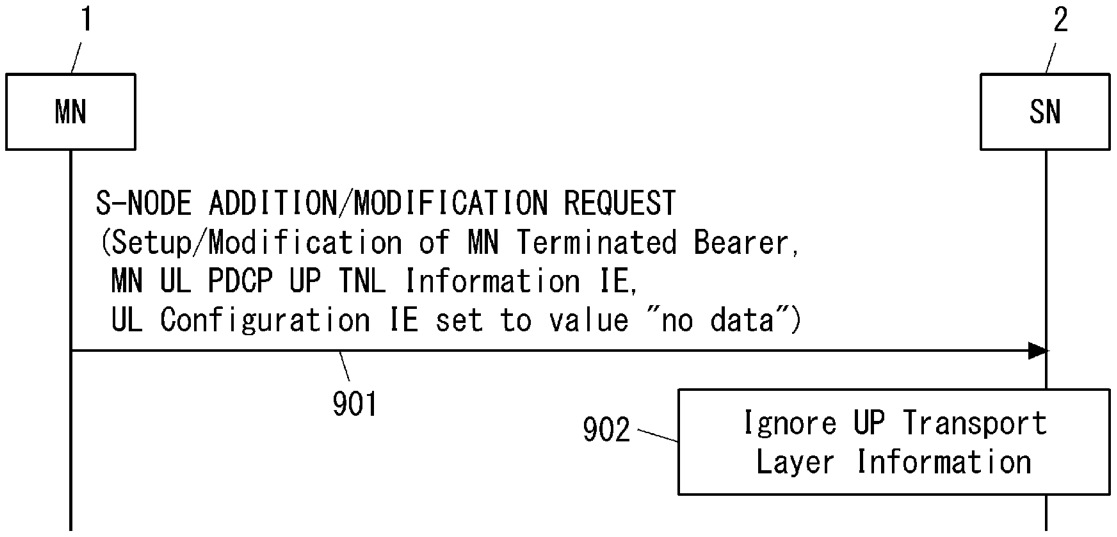
FIG. 9 is a sequence diagram showing an example of signaling according to an embodiment.

The following describes specific examples of the operations of MN 1 and SN 2 described using FIGS. 7 and 8. The signaling shown in FIG. 9 relates to an SN addition procedure and an SN modification procedure. This SN addition procedure is an S-NG-RAN node Addition Preparation procedure. This SN modification procedure is an M-NG-RAN node initiated S-NG-RAN node Modification Preparation procedure.

In step 901, the MN 1 sends an S-NODE ADDITION REQUEST message to the SN 2. The S-NODE ADDITION REQUEST message informs the SN 2 of the setup of an MN terminated bearer with respect to a PDU Session of the UE 3. In other words, the S-NODE ADDITION REQUEST message requests the SN 2 to add or set up SN resources for an MN terminated bearer. More specifically, the S-NODE ADDITION REQUEST message contains a PDU Session Resources To Be Added Item IE regarding the PDU Session in question. The PDU Session Resources To Be Added Item IE contains a PDU Session Resource Setup Info—MN terminated IE. The PDU Session Resource Setup Info—MN terminated IE contains a DRBs to Be Setup Item IE regarding the MN terminated bearer. The DRBs to Be Setup Item IE contains an MN UL PDCP UP TNL Information IE containing a Cell Group ID IE, and also contains a UL Configuration IE. In the example in FIG. 4, the UL Configuration IE is set to the value "no data", which indicates that the uplink of the SN 2 is not used for the MN terminated bearer.

In step 901, the MN 1 may instead send an S-NODE MODIFICATION REQUEST message to the SN 2. The S-NODE MODIFICATION REQUEST message informs the SN 2 of the setup or modification of an MN terminated bearer with respect to a PDU Session of the UE 3. In other words, the S-NODE MODIFICATION REQUEST message requests the SN 2 to add (or set up) or modify SN resources for an MN terminated bearer. More specifically, the S-NODE MODIFICATION REQUEST message may contain a PDU Session Resources To Be Added Item IE regarding the setup of the PDU Session in question. The PDU Session Resources To Be Added Item IE contains a PDU Session Resource Setup Info—MN terminated IE. Alternatively, the S-NODE MODIFICATION REQUEST message may contain a PDU Session Resources To Be Modified Item IE regarding the modification of the PDU Session in question. The PDU Session Resources To Be Modified Item IE contains a PDU Session Resource Modification Info—MN terminated IE. The PDU Session Resource Setup Info—MN terminated IE (or PDU Session Resource Modification Info—MN terminated IE) contains a DRBs to Be Setup Item IE (or DRBs to Be Modified Item IE) pertaining to the MN terminated bearer. The DRBs to Be Setup Item IE (or DRBs to Be Modified Item IE) contains an MN UL PDCP UP TNL Information IE containing a Cell Group ID IE, and also contains a UL Configuration IE. In the example in FIG. 9, the UL Configuration IE is set to the value "no data", which indicates that the uplink of the SN 2 is not used for the MN terminated bearer.

In step 902, the SN 2 recognizes that the UL Configuration IE within the DRBs to Be Setup Item IE (or DRBs to Be Modified Item IE) for the requested MN terminated bearer is set to the value "no data". Accordingly, the SN 2 ignores the UP Transport Layer information about the MN 1 as indicated by the MN UL PDCP UP TNL Information IE within that DRBs to Be Setup Item IE (or DRBs to Be Modified Item IE).

Figure 10:
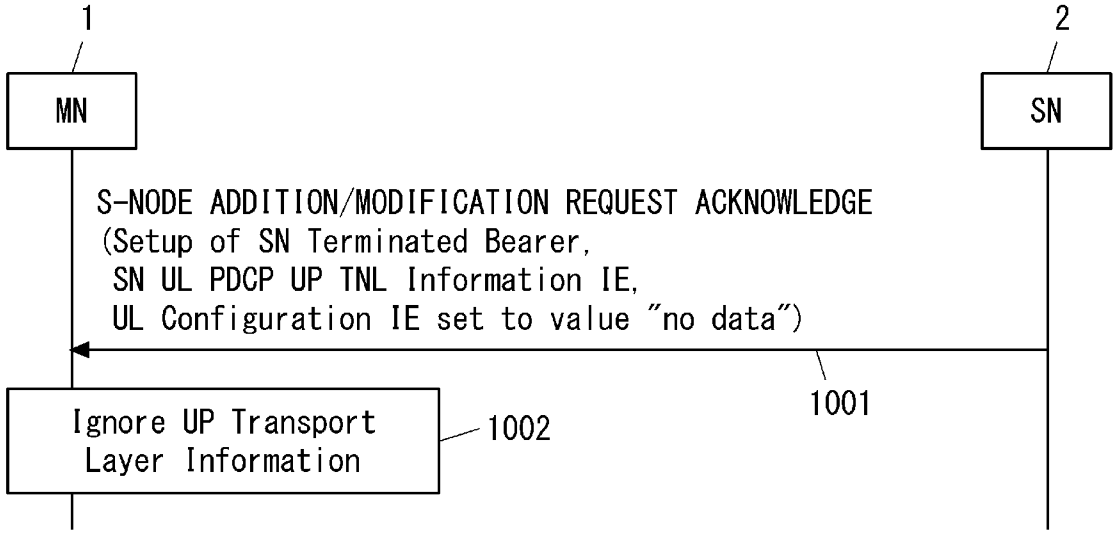
FIG. 10 is a sequence diagram showing an example of signaling according to an embodiment.

The signaling shown in FIG. 10 relates to an SN addition procedure and an SN modification procedure. This SN addition procedure is an S-NG-RAN node Addition Preparation procedure. This SN modification procedure is an M-NG-RAN node initiated S-NG-RAN node Modification Preparation procedure.

In step 1001, the SN 2 sends an S-NODE ADDITION REQUEST ACKNOWLEDGE message to the MN 1. The S-NODE ADDITION REQUEST ACKNOWLEDGE message informs the MN 1 of the setup of an SN terminated bearer for a PDU Session of the UE 3. In other words, the S-NODE ADDITION REQUEST ACKNOWLEDGE message requests the MN 1 to add or set up MN resources for an SN terminated bearer. More specifically, the S-NODE ADDITION REQUEST ACKNOWLEDGE message contains a PDU Session Resources Admitted To Be Added Item IE for the PDU Session in question. The PDU Session Resources Admitted To Be Added Item IE contains a PDU Session Resource Setup Response Info—SN terminated IE. The PDU Session Resource Setup Response Info—SN terminated IE contains an SN UL PDCP UP TNL Information IE containing a Cell Group ID IE, and also contains a UL Configuration IE. In the example in FIG. 10, the UL Configuration IE is set to the value "no data", which indicates that the uplink of the MN 1 is not used for the SN terminated bearer.

In step 1001, SN 2 may instead send an S-NODE MODIFICATION REQUEST ACKNOWLEDGE message to the MN 1. The S-NODE MODIFICATION REQUEST ACKNOWLEDGE message requests the MN 1 to set up an SN terminated bearer with respect to a PDU Session of the UE 3. In other words, the S-NODE MODIFICATION REQUEST ACKNOWLEDGE message requests the MN 1 to add or set up MN resources for an SN terminated bearer. More specifically, the S-NODE MODIFICATION REQUEST ACKNOWLEDGE message may contain a PDU Session Resources Admitted To Be Added Item IE regarding the setup of the PDU Session in question. The PDU Session Resources Admitted To Be Added Item IE contains a PDU Session Resource Setup Response Info—SN terminated IE. Alternatively, the S-NODE MODIFICATION REQUEST ACKNOWLEDGE message may contain a PDU Session Resources Admitted To Be Modified Item IE regarding the modification of the PDU Session in question. The PDU Session Resources Admitted To Be Modified Item IE contains a PDU Session Resource Modification Response Info—SN terminated IE. The PDU Session Resource Setup Response Info—SN terminated IE (or PDU Session Resource Modification Response Info—SN terminated IE) contains a DRBs to Be Setup Item IE pertaining to the SN terminated bearer. The DRBs to Be Setup Item IE contains an SN UL PDCP UP TNL Information IE containing a Cell Group ID IE, and also contains a UL Configuration IE. In the example in FIG. 10, the UL Configuration IE is set to the value "no data", which indicates that the uplink of the MN 1 is not used for the SN terminated bearer.

In step 1002, the MN 1 recognizes that the UL Configuration IE within the DRBs to Be Setup Item IE (or DRBs to Be Modified Item IE) for the requested SN terminated bearer is set to the value "no data". Accordingly, the MN 1 ignores the UP Transport Layer information about the SN 2 as indicated by the SN UL PDCP UP TNL Information IE within that DRBs to Be Setup Item IE (or DRBs to Be Modified Item IE).

Figure 11:
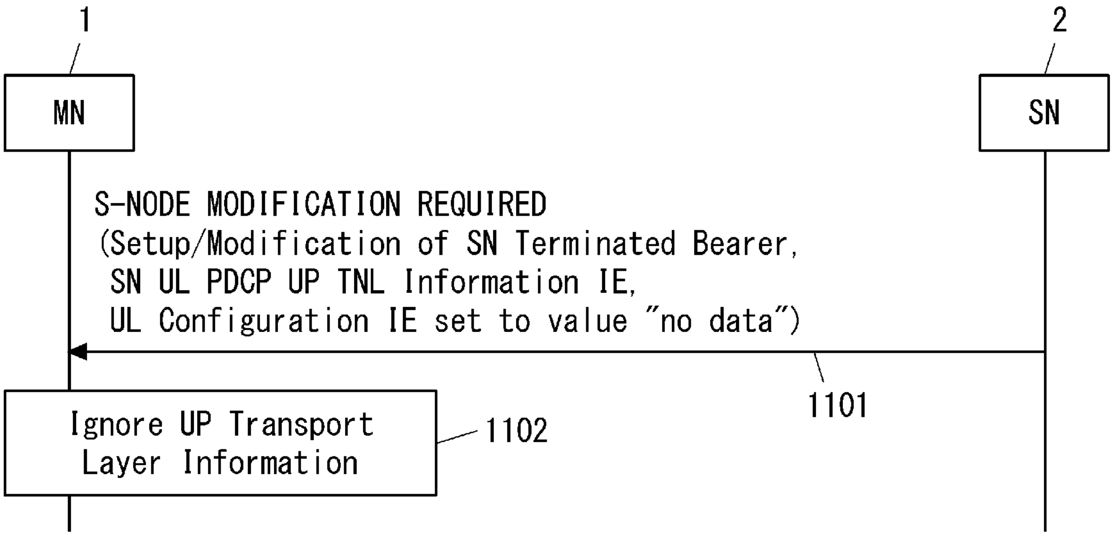
FIG. 11 is a sequence diagram showing an example of signaling according to an embodiment.

The signaling shown in FIG. 11 relates to an SN modification procedure. This SN modification procedure is an S-NG-RAN node initiated S-NG-RAN node Modification procedure.

In step 1101, the SN 2 sends an S-NODE MODIFICATION REQUIRED message to the MN 1. The S-NODE MODIFICATION REQUIRED message informs the MN 1 of the setup or modification of an SN terminated bearer with respect to a PDU Session of the UE 3. In other words, the S-NODE MODIFICATION REQUIRED message requests the MN 1 to add (or set up) or modify MN resources for an SN terminated bearer. More specifically, the S-NODE MODIFICATION REQUIRED message may contain a PDU Session Resources To Be Modified Item IE regarding the modification of the PDU Session in question. The PDU Session Resources To Be Modified Item IE contains a PDU Session Resource Modification Required Info—SN terminated IE. The PDU Session Resource Modification Required Info—SN terminated IE contains a DRBs to Be Setup Item IE (or DRBs to Be Modified Item IE) regarding the SN terminated bearer. The DRBs to Be Setup Item IE (or DRBs to Be Modified Item IE) contains an SN UL PDCP UP TNL Information IE containing a Cell Group ID IE, and also contains a UL Configuration IE. In the example in FIG. 11, the UL Configuration IE is set to the value "no data", which indicates that the uplink of the MN 1 is not used for the SN terminated bearer.

In step 1102, the MN 1 recognizes that the UL Configuration IE within the DRBs to Be Setup Item IE (or DRBs to Be Modified Item IE) pertaining to the requested SN terminated bearer is set to the value "no data". In response, the MN 1 ignores the UP transport layer information on the SN 2 indicated by the SN UL PDCP UP TNL Information IE within the DRBs to Be Setup Item IE (or DRBs to Be Modified Item IE).

According to the operation of the MN 1 described in this embodiment, if the UL Configuration IE received from the SN 2 for setting up or modifying MN resources for an SN terminated bearer is set to the value "no data" (i.e., if the UL of the MN 1 will not be used for that SN terminated bearer), the MN 1 ignores the information about the SN endpoint received with respect to that SN terminated bearer. In this way, the MN 1 is not affected by the inconsistency between the Cell Group ID IE and the UL Configuration IE received from the SN 2 for the setup or modification of MN resources for the SN terminated bearer. Similarly, according to the operation of the SN 2 described in this embodiment, if the UL Configuration IE received from the MN 1 for setting up or modifying SN resources for an MN terminated bearer is set to the value "no data" (i.e., if the UL of the SN 2 will not be used for that MN terminated bearer), the SN 2 ignores the information about the MN endpoint received with respect to that MN terminated bearer. In this way, the SN 2 is not affected by the inconsistency between the Cell Group ID IE and the UL Configuration IE received from the MN 1 for the setup or modification of SN resources for the MN terminated bearer.

Third Embodiment

A configuration example of a radio communication network according to this embodiment is the same as the example shown in FIG. 1. This embodiment provides other examples of the operations of the MN 1 and the SN 2.

Figure 12:
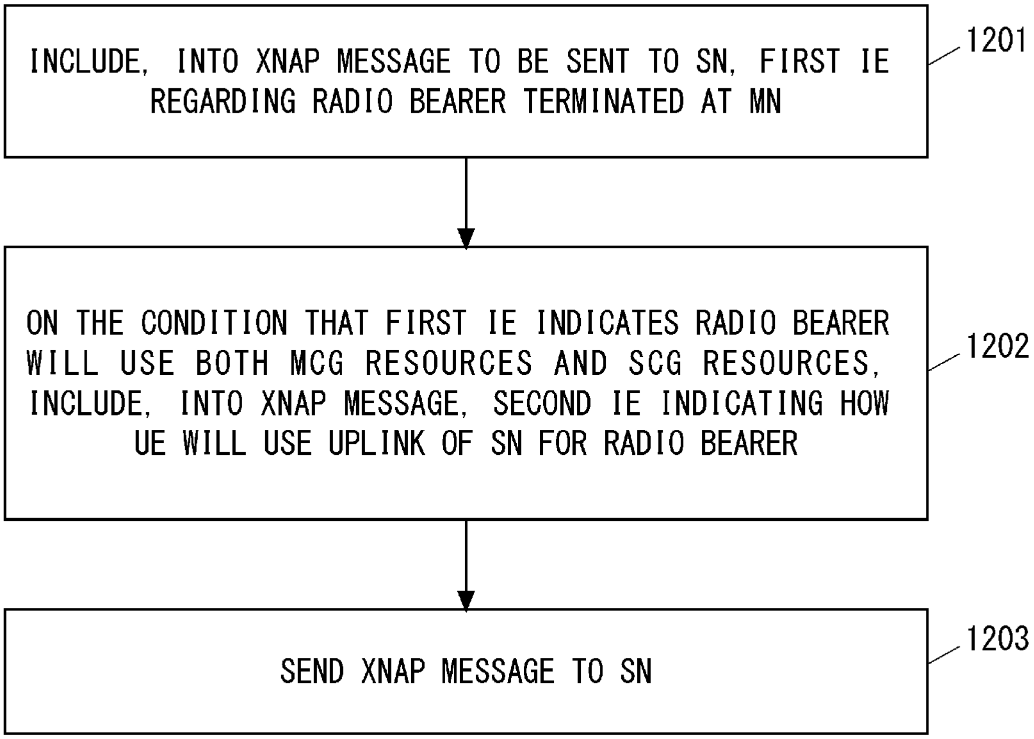
FIG. 12 is a flowchart showing an example of the operation of an MN according to an embodiment.

FIG. 12 shows an example of the operation of the MN 1. In step 1201, the MN 1 includes into an XnAP message to be sent to the SN 2 a first IE regarding a radio bearer (MN terminated bearer) terminated at the MN 1. The XnAP message may be an S-NODE ADDITION REQUEST message or an S-NODE MODIFICATION REQUEST message. In step 1202, on the condition that the first IE indicates that the radio bearer will use both MCG resources and SCG resources, the MN 1 includes into the XnAP message a second IE indicating how the UE 3 will use the uplink of the SN 2 for that radio bearer. In other words, the second IE is a conditional IE that is included in the XnAP message when the predetermined condition regarding the first IE is satisfied. In step 1203, the MN 1 sends the XnAP message to the SN 2.

In some implementations, the first IE may be a Cell Group ID IE contained in an MN UL PDCP UP TNL Information IE contained in a DRBs to Be Setup Item IE (or DRBs to Be Modified Item IE) associated with the radio bearer (i.e., MN terminated bearer). The Cell Group ID IE can be set to only the value "0" meaning MCG, or only the value "1" meaning SCG, or both the value "0" and the value "1". If the Cell Group ID IE is set to both the value "0" and the value "1", this may indicate that the radio bearer (i.e., MN terminated bearer) uses both MCG resources and SCG resources.

Alternatively, the first IE may be an IE different from the Cell Group ID IE described above. For example, the first IE may be a new IE that indicates whether the radio bearer (i.e., MN terminated bearer) is an MCG bearer, split bearer, or SCG bearer. For example, the new IE may be set to the value "MCG bearer", "split bearer", or "SCG bearer". The name of the new IE may be, for example, but not limited to, Selected Bearer Type IE.

Meanwhile, the second IE may be a UL Configuration IE contained in that DRBs to Be Setup Item IE (or DRBs to Be Modified Item IE). This UL Configuration IE indicates how the UE 3 will use the uplink of the corresponding RAN node (i.e., SN 2) for that radio bearer (i.e., MN terminated bearer). More specifically, the UL Configuration IE can be set to the value "no data", the value "shared", or the value "only". The value "no data" means that the UE 3 does not use the uplink of the corresponding node (i.e., SN 2) for that radio bearer (i.e., MN terminated bearer). The value "shared" means that the UE 3 uses both the uplink of the corresponding node (i.e., SN 2) and the uplink of the other node (i.e., MN 1) for the radio bearer (i.e., MN terminated bearer). The value "only" means that the UE 3 uses only the uplink of the corresponding node (i.e., SN 2) for the radio bearer (i.e., MN terminated bearer).

Figure 13:
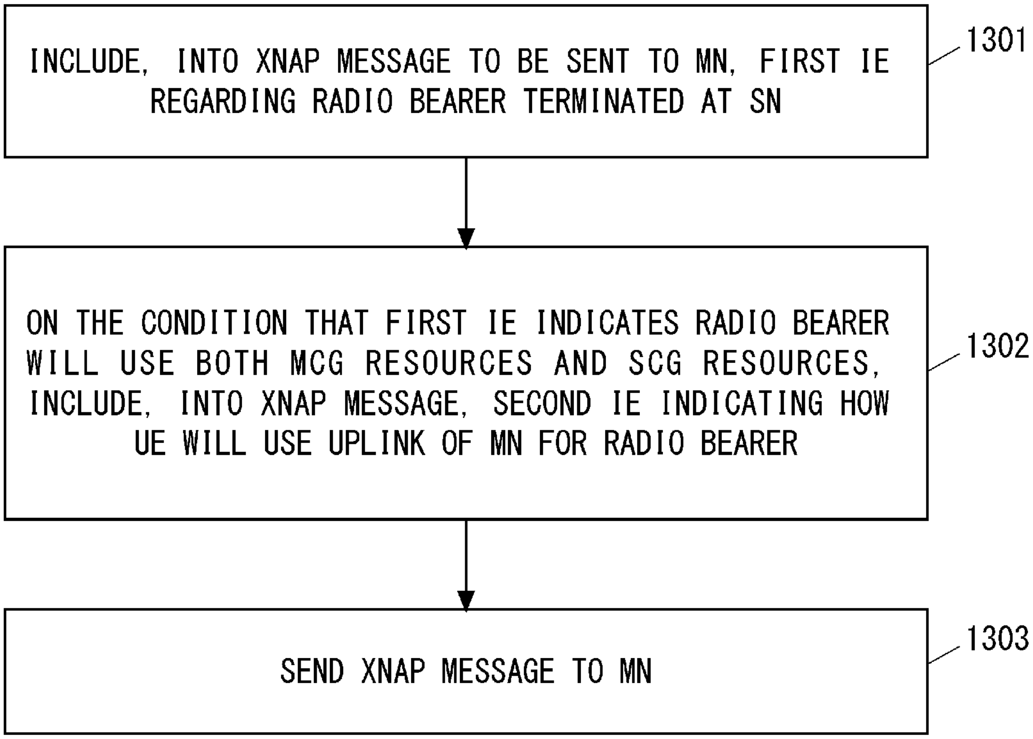
FIG. 13 is a flowchart showing an example of the operation of an SN according to an embodiment.

FIG. 13 shows an example of the operation of the SN 2. In step 1301, the SN 2 includes into an XnAP message to be sent to the MN 1 a first IE regarding a radio bearer (SN terminated bearer) terminated at the SN 2. The XnAP message may be an S-NODE ADDITION REQUEST ACKNOWLEDGE message, an S-NODE MODIFICATION REQUEST ACKNOWLEDGE message, or an S-NODE MODIFICATION REQUIRED message. In step 1302, provided that the first IE indicates that the radio bearer will use both MCG resources and SCG resources, the SN 2 includes into the XnAP message a second IE indicating how the UE 3 will use the uplink of the MN 1 for that radio bearer. In other words, the second IE is a conditional IE that is included in the XnAP message when the predetermined condition regarding the first IE is satisfied. In step 1303, the SN 2 sends the XnAP message to the MN 1.

In some implementations, the first IE may be a Cell Group ID IE contained in an SN UL PDCP UP TNL Information IE contained in a DRBs to Be Setup Item IE (or DRBs to Be Modified Item IE) associated with the radio bearer (i.e., SN terminated bearer). The Cell Group ID IE can be set to only the value "0" meaning MCG, or only the value "1" meaning SCG, or both the value "0" and the value "1". If the Cell Group ID IE is set to both the value "0" and the value "1", this may indicate that the radio bearer (i.e., SN terminated bearer) uses both MCG resources and SCG resources.

Alternatively, the first IE may be an IE different from the Cell Group ID IE described above. For example, the first IE may be a new IE that indicates whether the radio bearer (i.e., SN terminated bearer) is an MCG bearer, split bearer, or SCG bearer. For example, the new IE may be set to the value "MCG bearer", "split bearer", or "SCG bearer". The name of the new IE may be, for example, but not limited to, Selected Bearer Type IE.

Meanwhile, the second IE may be a UL Configuration IE contained in that DRBs to Be Setup Item IE (or DRBs to Be Modified Item IE). This UL Configuration IE indicates how the UE 3 will use the uplink of the corresponding RAN node (i.e., MN 1) for that radio bearer (i.e., SN terminated bearer). More specifically, the UL Configuration IE can be set to the value "no data", the value "shared", or the value "only". The value "no data" means that the UE 3 does not use the uplink of the corresponding node (i.e., MN 1) for that radio bearer (i.e., SN terminated bearer). The value "shared" means that the UE 3 uses both the uplink of the corresponding node (i.e., MN 1) and the uplink of the other node (i.e., SN 2) for the radio bearer (i.e., SN terminated bearer). The value "only" means that the UE 3 uses only the uplink of the corresponding node (i.e., MN 1) for the radio bearer (i.e., SN terminated bearer).

According to the behavior of the MN 1 described in this embodiment, provided that a first IE indicates that an MN terminated bearer will use both the resources of the MCG and the resources of the SCG, the MN 1 includes into the XnAP message a second IE indicating how the UE 3 will use the uplink of the SN 2 for the MN terminated bearer. This allows the MN 1 to prevent any inconsistencies between the first IE and the second IE. Similarly, according to the behavior of the SN 2 described in this embodiment, on the condition that a first IE indicates that an SN terminated bearer will use both resources of the MCG and resources of the SCG, the SN 2 includes into the XnAP message a second IE indicating how the UE 3 will use the uplink of the MN 1 for the SN terminated bearer. This allows the SN 2 to prevent any inconsistencies between the first IE and the second IE.

Figure 14:
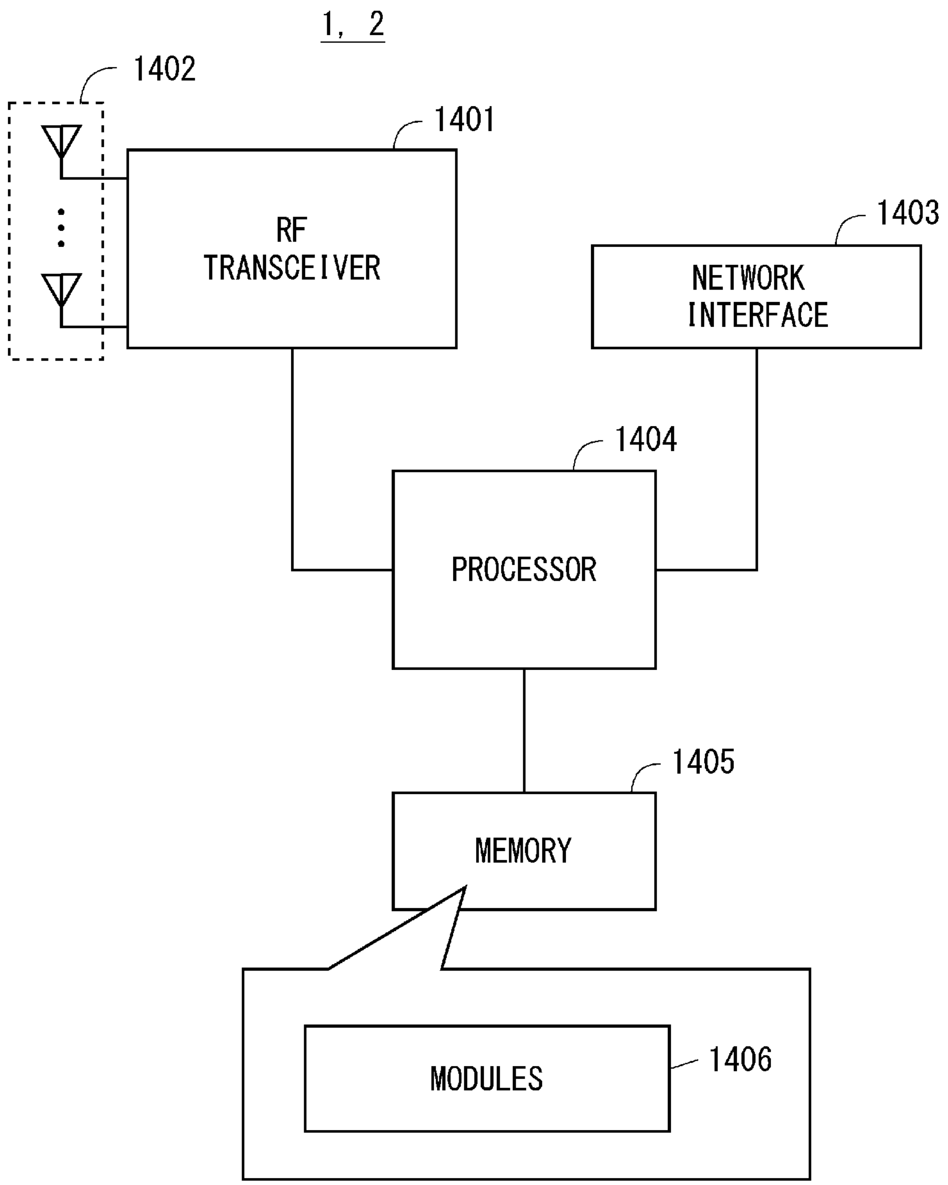
FIG. 14 is a block diagram showing an example configuration of an MN and an SN according to an embodiment.

The following provides configuration examples of the MN 1 and the SN 2 according to the above-described embodiments. FIG. 14 is a block diagram showing a configuration example of the MN 1 according to the above-described embodiments. The configuration of the SN 2 may be the same as that shown in FIG. 14. Referring to FIG. 14, the MN 1 includes a Radio Frequency transceiver 1401, a network interface 1403, a processor 1404, and a memory 1405. The RF transceiver 1401 performs analog RF signal processing to communicate with UEs including the UE 3. The RF transceiver 1401 may include a plurality of transceivers. The RF transceiver 1401 is coupled to an antenna array 1402 and the processor 1404. The RF transceiver 1401 receives modulation symbol data from the processor 1404, generates a transmission RF signal, and supplies the transmission RF signal to the antenna array 1402. The RF transceiver 1401 generates a baseband reception signal based on a reception RF signal received by the antenna array 1402 and supplies the baseband reception signal to the processor 1404. The RF transceiver 1401 may include an analog beamformer circuit for beamforming. The analog beamformer circuit includes, for example, a plurality of phase shifters and a plurality of power amplifiers.

The network interface 1403 is used to communicate with network nodes (e.g., MN 1, and control node and transfer node of a core network). The network interface 1403 may include, for example, a Network Interface Card (NIC) that is compliant with IEEE 802.3 series.

The processor 1404 performs digital baseband signal processing (data-plane processing) and control-plane processing for radio communication. The processor 1404 may include a plurality of processors. For example, the processor 1404 may include a modem processor (e.g., Digital Signal Processor (DSP)) for performing the digital baseband signal processing and a protocol stack processor (e.g., Central Processing Unit (CPU) or Micro Processing Unit (MPU)) for performing the control-plane processing. The processor 1404 may include a digital beamformer module for beamforming. The digital beamformer module may include a Multiple Input Multiple Output (MIMO) encoder and precoder.

The memory 1405 is composed of a combination of a volatile memory and a non-volatile memory. The volatile memory is, for example, a Static Random Access Memory (SRAM), a Dynamic RAM (DRAM), or a combination thereof. The non-volatile memory may be a Mask Read Only Memory (MROM), an Electrically Erasable Programmable ROM (EEPROM), a flash memory, or a hard disk drive, or any combination thereof. The memory 1405 may include a storage located away from the processor 1404. In this case, the processor 1404 may access the memory 1405 via the network interface 1403 or an I/O interface not shown.

The memory 1405 may store one or more software modules (computer programs) 1406 including instructions and data for performing processing by the MN 1 described in the above embodiments. In some implementations, the processor 1404 may be configured to load and execute the software module(s) 1406 from the memory 1405, thereby performing the processing of the MN 1 described in the above embodiments.

When the MN 1 (or SN 2) is a CU (e.g., eNB-CU or gNB-CU) or a CU-CP, the MN 1 (or SN 2) does not have to include the RF transceiver 1401 (and the antenna array 1402).

As described using FIG. 14, each of the processors in the MN 1 and SN 2 according to the embodiments described above executes one or more programs, containing a set of instructions, to cause a computer to perform an algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

The above-described embodiments are merely examples of applications of the technical ideas obtained by the inventors. These technical ideas are not limited to the above-described embodiments and various modifications can be made thereto.

The whole or part of the embodiments disclosed above can be described as, but not limited to, the following supplementary notes.

(Supplementary Note 1)

A first radio access network (RAN) node comprising:

at least one memory; and at least one processor coupled to the at least one memory and configured to:

receive from a second RAN node, in a control procedure for dual connectivity for a User Equipment (UE), a first message indicating a setup or modification of a radio bearer terminated at the second RAN node; and reject the setup or modification of the radio bearer if a first information element (IE) in the first message indicates that the radio bearer will only use resources in a cell group of the first RAN node, and if a second IE in the first message indicates that the UE will not use an uplink of the first RAN node for the radio bearer.

(Supplementary Note 2)

The first RAN node according to Supplementary Note 1, wherein the first IE is a Cell Group ID IE contained in an MN UL PDCP UP TNL Information IE or SN UL PDCP UP TNL Information IE contained in a DRBs to Be Setup Item IE or DRBs to Be Modified Item IE associated with the radio bearer, and the second IE is a UL Configuration IE contained in the DRBs to Be Setup Item IE or DRBs to Be Modified Item IE.

(Supplementary Note 3)

The first RAN node according to Supplementary Note 2, wherein the first RAN node is a secondary node (SN) of the dual connectivity, the second RAN node is a master node (MN) of the dual connectivity, the radio bearer is an MN terminated bearer, the control procedure is an S-NG-RAN node Addition Preparation procedure, the first message is an S-NODE ADDITION REQUEST message containing a PDU Session Resources To Be Added Item IE containing a PDU Session Resource Setup Info—MN terminated information element (IE), and the at least one processor is configured to reject the setup of the radio bearer if the UL Configuration IE in the DRBs to Be Setup Item IE contained in the PDU Session Resource Setup Info—MN terminated IE is set to a value of "no data", and if the Cell Group ID IE contained in the MN UL PDCP UP TNL Information IE in the DRBs to Be Setup Item IE is set to only a value of "1" meaning Secondary Cell Group (SCG).

(Supplementary Note 4)

The first RAN node according to Supplementary Note 3, wherein the rejection of the setup of the radio bearer includes rejecting the S-NG-RAN node Addition Preparation procedure by sending an S-NODE ADDITION REQUEST REJECT message to the MN.

(Supplementary Note 5)

The first RAN node according to Supplementary Note 3, wherein the rejection of the setup of the radio bearer includes sending to the MN an S-NODE ADDITION REQUEST ACKNOWLEDGE message containing a PDU Session Resource Setup Response Info—MN terminated IE indicating that the setup of the radio bearer is not acceptable.

(Supplementary Note 6)

The first RAN node according to Supplementary Note 2, wherein the first RAN node is a secondary node (SN) of the dual connectivity, the second RAN node is a master node (MN) of the dual connectivity, the radio bearer is an MN terminated bearer, the control procedure is an M-NG-RAN node initiated S-NG-RAN node Modification Preparation procedure, the first message is an S-NODE MODIFICATION REQUEST message containing a PDU Session Resources To Be Added Item IE containing a PDU Session Resource Setup Info—MN terminated Information Element (IE), and the at least one processor is configured to reject the setup of the radio bearer if the UL Configuration IE in the DRBs to Be Setup Item IE contained in the PDU Session Resource Setup Info—MN terminated IE is set to a value of "no data", and if the Cell Group ID IE contained in the MN UL PDCP UP TNL Information IE in the DRBs to Be Setup Item IE is set to only a value of "1" meaning Secondary Cell Group (SCG).

(Supplementary Note 7)

The first RAN node according to Supplementary Note 6, wherein the rejection of the setup of the radio bearer includes rejecting the M-NG-RAN node initiated S-NG-RAN node Modification Preparation procedure by sending an S-NODE MODIFICATION REQUEST REJECT message to the MN.

(Supplementary Note 8)

The first RAN node according to Supplementary Note 6, wherein the rejection of the setup of the radio bearer includes sending to the MN an S-NODE MODIFICATION REQUEST ACKNOWLEDGE message containing a PDU Session Resource Setup Response Info—MN terminated IE indicating that the setup of the radio bearer is not acceptable.

(Supplementary Note 9)

The first RAN node according to Supplementary Note 2, wherein the first RAN node is a secondary node (SN) of the dual connectivity, the second RAN node is a master node (MN) of the dual connectivity, the radio bearer is an MN terminated bearer, the control procedure is an M-NG-RAN node initiated S-NG-RAN node Modification Preparation procedure, the first message is an S-NODE MODIFICATION REQUEST message containing a PDU Session Resources To Be Modified Item IE containing a PDU Session Resource Modification Info—MN terminated Information Element (IE), and the at least one processor is configured to reject the setup of the radio bearer if the UL Configuration IE in the DRBs to Be Setup Item IE contained in the PDU Session Resource Modification Info—MN terminated IE is set to a value of "no data", and if the Cell Group ID IE contained in the MN UL PDCP UP TNL Information IE in the DRBs to Be Setup Item IE is set to only a value of "1" meaning Secondary Cell Group (SCG).

(Supplementary Note 10)

The first RAN node according to Supplementary Note 9, wherein the rejection of the setup of the radio bearer includes rejecting the M-NG-RAN node initiated S-NG-RAN node Modification Preparation procedure by sending an S-NODE MODIFICATION REQUEST REJECT message to the MN.

(Supplementary Note 11)

The first RAN node according to Supplementary Note 9, wherein the rejection of the setup of the radio bearer includes sending to the MN an S-NODE MODIFICATION REQUEST ACKNOWLEDGE message containing a PDU Session Resource Modification Response Info—MN terminated IE indicating that the setup of the radio bearer is not acceptable.

(Supplementary Note 12)

The first RAN node according to Supplementary Note 2, wherein the first RAN node is a secondary node (SN) of the dual connectivity, the second RAN node is a master node (MN) of the dual connectivity, the radio bearer is an MN terminated bearer, the control procedure is an M-NG-RAN node initiated S-NG-RAN node Modification Preparation procedure, the first message is an S-NODE MODIFICATION REQUEST message containing a PDU Session Resources To Be Modified Item IE containing a PDU Session Resource Modification Info—MN terminated Information Element (IE), and the at least one processor is configured to reject the modification of the radio bearer if the UL Configuration IE in the DRBs to Be Modified Item IE contained in the PDU Session Resource Modification Info—MN terminated IE is set to a value of "no data", and if the Cell Group ID IE contained in the MN UL PDCP UP TNL Information IE in the DRBs to Be Modified Item IE is set to only a value of "1" meaning Secondary Cell Group (SCG).

(Supplementary Note 13)

The first RAN node according to Supplementary Note 12, wherein the rejection of the modification of the radio bearer includes rejecting the M-NG-RAN node initiated S-NG-RAN node Modification Preparation procedure by sending an S-NODE MODIFICATION REQUEST REJECT message to the MN.

(Supplementary Note 14)

The first RAN node according to Supplementary Note 13, wherein the rejection of the modification of the radio bearer includes sending to the MN an S-NODE MODIFICATION REQUEST ACKNOWLEDGE message containing a PDU Session Resource Modification Response Info—MN terminated IE indicating that the modification of the radio bearer is not acceptable.

(Supplementary Note 15)

The first RAN node according to Supplementary Note 2, wherein the first RAN node is a master node (MN) of the dual connectivity, the second RAN node is a secondary node (SN) of the dual connectivity, the radio bearer is an SN terminated bearer, the control procedure is an S-NG-RAN node Addition Preparation procedure, the first message is an S-NODE ADDITION REQUEST ACKNOWLEDGE message containing a PDU Session Resources Admitted To Be Added Item IE containing a PDU Session Resource Setup Response Info—SN terminated information element (IE), and the at least one processor is configured to reject the setup of the radio bearer if the UL Configuration IE in the DRBs to Be Setup Item IE contained in the PDU Session Resource Setup Response Info—SN terminated IE is set to a value of "no data", and if the Cell Group ID IE contained in the SN UL PDCP UP TNL Information IE in the DRBs to Be Setup Item IE is set to only a value of "0" meaning Master Cell Group (MCG).

(Supplementary Note 16)

The first RAN node according to Supplementary Note 15, wherein the rejection of the setup of the radio bearer includes initiating an M-NG-RAN node initiated S-NG-RAN node Release procedure.

(Supplementary Note 17)

The first RAN node according to Supplementary Note 15, wherein the rejection of the setup of the radio bearer includes initiating an M-NG-RAN node initiated S-NG-RAN node Modification Preparation procedure to release the radio bearer.

(Supplementary Note 18)

The first RAN node according to Supplementary Note 2, wherein the first RAN node is a master node (MN) of the dual connectivity, the second RAN node is a secondary node (SN) of the dual connectivity, the radio bearer is an SN terminated bearer, the control procedure is an M-NG-RAN node initiated S-NG-RAN node Modification Preparation procedure, the first message is an S-NODE MODIFICATION REQUEST ACKNOWLEDGE message containing a PDU Session Resources Admitted To Be Added Item IE containing a PDU Session Resource Setup Response Info—SN terminated information element (IE), and the at least one processor is configured to reject the setup of the radio bearer if the UL Configuration IE in the DRBs to Be Setup Item IE contained in the PDU Session Resource Setup Response Info—SN terminated IE is set to a value of "no data", and if the Cell Group ID IE contained in the SN UL PDCP UP TNL Information IE in the DRBs to Be Setup Item IE is set to only a value of "0" meaning Master Cell Group (MCG).

(Supplementary Note 19)

The first RAN node according to Supplementary Note 18, wherein the rejection of the setup of the radio bearer includes initiating an M-NG-RAN node initiated S-NG-RAN node Release procedure.

(Supplementary Note 20)

The first RAN node according to Supplementary Note 18, wherein the rejection of the setup of the radio bearer includes initiating an M-NG-RAN node initiated S-NG-RAN node Modification Preparation procedure to release the radio bearer.

(Supplementary Note 21)

The first RAN node according to Supplementary Note 2, wherein the first RAN node is a master node (MN) of the dual connectivity, the second RAN node is a secondary node (SN) of the dual connectivity, the radio bearer is an SN terminated bearer, the control procedure is an M-NG-RAN node initiated S-NG-RAN node Modification Preparation procedure, the first message is an S-NODE MODIFICATION REQUEST ACKNOWLEDGE message containing a PDU Session Resources Admitted To Be Modified Item IE containing a PDU Session Resource Modification Response Info—SN terminated information element (IE), and the at least one processor is configured to reject the setup of the radio bearer if the UL Configuration IE in the DRBs to Be Setup Item IE contained in the PDU Session Resource Modification Response Info—SN terminated IE is set to a value of "no data", and if the Cell Group ID IE contained in the SN UL PDCP UP TNL Information IE in the DRBs to Be Setup Item IE is set to only a value of "0" meaning Master Cell Group (MCG).

(Supplementary Note 22)

The first RAN node according to Supplementary Note 21, wherein the rejection of the setup of the radio bearer includes initiating an M-NG-RAN node initiated S-NG-RAN node Release procedure.

(Supplementary Note 23)

The first RAN node according to Supplementary Note 21, wherein the rejection of the setup of the radio bearer includes initiating an M-NG-RAN node initiated S-NG-RAN node Modification Preparation procedure to release the radio bearer.

(Supplementary Note 24)

The first RAN node according to Supplementary Note 2, wherein the first RAN node is a master node (MN) of the dual connectivity, the second RAN node is a secondary node (SN) of the dual connectivity, the radio bearer is an SN terminated bearer, the control procedure is an S-NG-RAN node initiated S-NG-RAN node Modification procedure, the first message is an S-NODE MODIFICATION REQUIRED message containing a PDU Session Resources To Be Modified Item IE containing a PDU Session Resource Modification Required Info—SN terminated information element (IE), and the at least one processor is configured to reject the setup of the radio bearer if the UL Configuration IE in the DRBs to Be Setup Item IE contained in the PDU Session Resource Modification Required Info—SN terminated IE is set to a value of "no data", and if the Cell Group ID IE contained in the SN UL PDCP UP TNL Information IE in the DRBs to Be Setup Item IE is set to only a value of "0" meaning Master Cell Group (MCG).

(Supplementary Note 25)

The first RAN node according to Supplementary Note 24, wherein the rejection of the setup of the radio bearer includes rejecting the S-NG-RAN node initiated S-NG-RAN node Modification procedure.

(Supplementary Note 26)

The first RAN node according to Supplementary Note 24, wherein the rejection of the setup of the radio bearer includes sending to the SN an S-NODE MODIFICATION CONFIRM message containing a PDU Session Resource Modification Confirm Info—SN terminated IE indicating that the setup of the radio bearer is not acceptable.

(Supplementary Note 27)

The first RAN node according to Supplementary Note 2, wherein the first RAN node is a master node (MN) of the dual connectivity, the second RAN node is a secondary node (SN) of the dual connectivity, the radio bearer is an SN terminated bearer, the control procedure is an S-NG-RAN node initiated S-NG-RAN node Modification procedure, the first message is an S-NODE MODIFICATION REQUIRED message containing a PDU Session Resources To Be Modified Item IE containing a PDU Session Resource Modification Required Info—SN terminated information element (IE), and the at least one processor is configured to reject the modification of the radio bearer if the UL Configuration IE in the DRBs to Be Modified Item IE contained in the PDU Session Resource Modification Required Info—SN terminated IE is set to a value of "no data", and if the Cell Group ID IE contained in the SN UL PDCP UP TNL Information IE in the DRBs to Be Modified Item IE is set to only a value of "0" meaning Master Cell Group (MCG).

(Supplementary Note 28)

The first RAN node according to Supplementary Note 27, wherein the rejection of the modification of the radio bearer includes rejecting the S-NG-RAN node initiated S-NG-RAN node Modification procedure.

(Supplementary Note 29)

The first RAN node according to Supplementary Note 27, wherein the rejection of the modification of the radio bearer includes sending to the SN an S-NODE MODIFICATION CONFIRM message containing a PDU Session Resource Modification Confirm Info—SN terminated IE indicating that the modification of the radio bearer is not acceptable.

(Supplementary Note 30)

A method performed by a first radio access network (RAN) node, comprising:

receiving from a second RAN node, in a control procedure for dual connectivity for a User Equipment (UE), a first message indicating a setup or modification of a radio bearer terminated at the second RAN node; and rejecting the setup or modification of the radio bearer if a first information element (IE) in the first message indicates that the radio bearer will only use resources in a cell group of the first RAN node, and if a second IE in the first message indicates that the UE will not use an uplink of the first RAN node for the radio bearer.

(Supplementary Note 31)

A program causing a computer to perform a method for a first radio access network (RAN) node, the method comprising:

receiving from a second RAN node, in a control procedure for dual connectivity for a User Equipment (UE), a first message indicating a setup or modification of a radio bearer terminated at the second RAN node; and rejecting the setup or modification of the radio bearer if a first information element (IE) in the first message indicates that the radio bearer will only use resources in a cell group of the first RAN node, and if a second IE in the first message indicates that the UE will not use an uplink of the first RAN node for the radio bearer.

(Supplementary Note 32)

A first radio access network (RAN) node comprising:

at least one memory; and at least one processor coupled to the at least one memory and configured to:

receive from a second RAN node, in a control procedure for dual connectivity for a User Equipment (UE), a first message indicating a setup or modification of a radio bearer terminated at the second RAN node; and ignore a first information element (IE) contained in the first message with respect to an endpoint of the second RAN node in an inter-RAN node tunnel used for delivery of uplink Protocol Data Units (PDUs) if a second information element (IE) in the first message indicates that the UE will not use an uplink of the first RAN node for the radio bearer.

(Supplementary Note 33)

The first RAN node according to Supplementary Note 32, wherein the first IE is a UP Transport Layer Information IE contained in an MN UL PDCP UP TNL Information IE or SN UL PDCP UP TNL Information IE contained in a DRBs to Be Setup Item IE or DRBs to Be Modified Item IE associated with the radio bearer, and the second IE is a UL Configuration IE contained in the DRBs to Be Setup Item IE or DRBs to Be Modified Item IE.

(Supplementary Note 34)

A method performed by a first radio access network (RAN) node, comprising:

receiving from a second RAN node, in a control procedure for dual connectivity for a User Equipment (UE), a first message indicating a setup or modification of a radio bearer terminated at the second RAN node; and ignoring a first information element (IE) contained in the first message with respect to an endpoint of the second RAN node in an inter-RAN node tunnel used for delivery of uplink Protocol Data Units (PDUs) if a second information element (IE) in the first message indicates that the UE will not use an uplink of the first RAN node for the radio bearer.

(Supplementary Note 35)

A program causing a computer to perform a method for a first radio access network (RAN) node, the method comprising:

receiving from a second RAN node, in a control procedure for dual connectivity for a User Equipment (UE), a first message indicating a setup or modification of a radio bearer terminated at the second RAN node; and ignoring a first information element (IE) contained in the first message with respect to an endpoint of the second RAN node in an inter-RAN node tunnel used for delivery of uplink Protocol Data Units (PDUs) if a second information element (IE) in the first message indicates that the UE will not use an uplink of the first RAN node for the radio bearer.

(Supplementary Note 36)

A radio access network (RAN) node configured to act as a master node (MN) for dual connectivity for a User Equipment (UE), comprising:

at least one memory; and at least one processor coupled to the at least one memory and configured to:

include, into a first message to be sent to a secondary node (SN) of the dual connectivity, a first information element (IE) regarding a radio bearer terminated at the MN;

on a condition that the first IE indicates that the radio bearer will use both resources in a master cell group (MCG) of the MN and resources in a secondary cell group (SCG) of the SN, include into the first message a second IE indicating how the UE will use an uplink of the SN for the radio bearer; and send the first message to the SN.

(Supplementary Note 37)

The RAN node according to Supplementary Note 36, wherein the first message is an S-NODE ADDITION REQUEST message or an S-NODE MODIFICATION REQUEST message.

(Supplementary Note 38)

The RAN node according to Supplementary Note 36 or 37, wherein the first IE is a Cell Group ID IE contained in an MN UL PDCP UP TNL Information IE contained in a DRBs to Be Setup Item IE or DRBs to Be Modified Item IE associated with the radio bearer, and the second IE is a UL Configuration IE contained in the DRBs to Be Setup Item IE or DRBs to Be Modified Item IE.

(Supplementary Note 39)

The RAN node according to Supplementary Note 38, wherein when both a value "0" meaning the MCG and a value "1" meaning the SCG are set in the Cell Group ID IE, the Cell Group ID IE indicates that the radio bearer will use both resources in the Master Cell Group (MCG) of the MN and resources in the Secondary Cell Group (SCG) of the SN.

(Supplementary Note 40)

A radio access network (RAN) node configured to act as a secondary node (SN) for dual connectivity for a User Equipment (UE), comprising:

at least one memory; and at least one processor coupled to the at least one memory and configured to:

include, into a first message to be sent to a master node (MN) of the dual connectivity, a first information element (IE) regarding a radio bearer terminated at the SN;

on a condition that the first IE indicates that the radio bearer will use both resources in a master cell group (MCG) of the MN and resources in a secondary cell group (SCG) of the SN, include into the first message a second IE indicating how the UE will use an uplink of the MN for the radio bearer; and send the first message to the MN.

(Supplementary Note 41)

The RAN node according to Supplementary Note 40, wherein the first message is an S-NODE ADDITION REQUEST ACKNOWLEDGE message, an S-NODE MODIFICATION REQUEST ACKNOWLEDGE message, or an S-NODE MODIFICATION REQUIRED message.

(Supplementary Note 42)

The RAN node according to Supplementary Note 40 or 41, wherein the first IE is a Cell Group ID IE contained in an SN UL PDCP UP TNL Information IE contained in a DRBs to Be Setup Item IE or DRBs to Be Modified Item IE associated with the radio bearer, and the second IE is a UL Configuration IE contained in the DRBs to Be Setup Item IE or DRBs to Be Modified Item IE.

(Supplementary Note 43)

The RAN node according to Supplementary Note 38, wherein when both a value "0" meaning the MCG and a value "1" meaning the SCG are set in the Cell Group ID IE, the Cell Group ID IE indicates that the radio bearer will use both resources in the Master Cell Group (MCG) of the MN and resources in the Secondary Cell Group (SCG) of the SN.

(Supplementary Note 44)

A method performed by a radio access network (RAN) node configured to act as a master node (MN) for dual connectivity for a User Equipment (UE), comprising:

including, into a first message to be sent to a secondary node (SN) of the dual connectivity, a first information element (IE) regarding a radio bearer terminated at the MN;

on a condition that the first IE indicates that the radio bearer will use both resources in a master cell group (MCG) of the MN and resources in a secondary cell group (SCG) of the SN, including into the first message a second IE indicating how the UE will use an uplink of the SN for the radio bearer; and sending the first message to the SN.

(Supplementary Note 45)

A method performed by a radio access network (RAN) node configured to act as a secondary node (SN) for dual connectivity for a User Equipment (UE), comprising:

including, into a first message to be sent to a master node (MN) of the dual connectivity, a first information element (IE) regarding a radio bearer terminated at the SN;

on a condition that the first IE indicates that the radio bearer will use both resources in a master cell group (MCG) of the MN and resources in a secondary cell group (SCG) of the SN, including into the first message a second IE indicating how the UE will use an uplink of the MN for the radio bearer; and sending the first message to the MN.

(Supplementary Note 46)

A program causing a computer to perform a method for a radio access network (RAN) node configured to act as a master node (MN) for dual connectivity for a User Equipment (UE), the method comprising:

including, into a first message to be sent to a secondary node (SN) of the dual connectivity, a first information element (IE) regarding a radio bearer terminated at the MN;

on a condition that the first IE indicates that the radio bearer will use both resources in a master cell group (MCG) of the MN and resources in a secondary cell group (SCG) of the SN, including into the first message a second IE indicating how the UE will use an uplink of the SN for the radio bearer; and sending the first message to the SN.

(Supplementary Note 47)

A program causing a computer to perform a method for a radio access network (RAN) node configured to act as a secondary node (SN) for dual connectivity for a User Equipment (UE), the method comprising:

including, into a first message to be sent to a master node (MN) of the dual connectivity, a first information element (IE) regarding a radio bearer terminated at the SN;

on a condition that the first IE indicates that the radio bearer will use both resources in a master cell group (MCG) of the MN and resources in a secondary cell group (SCG) of the SN, including into the first message a second IE indicating how the UE will use an uplink of the MN for the radio bearer; and sending the first message to the MN.

(Supplementary Note A1)

A method of a secondary base station in Dual Connectivity, comprising:

receiving a request message from a master base station of the Dual Connectivity; and if the secondary base station uses an SN terminated bearer that uses both resources in a Master Cell Group (MCG) and resources in a Secondary Cell Group (SCG), transmitting a request acknowledge message containing a UL Configuration Information Element (IE) to the master base station as a response to the request message.

(Supplementary Note A2)

The method according to Supplementary Note A1, wherein the UL Configuration information element is an information element indicating how a terminal device uses an uplink of the secondary base station.

(Supplementary Note A3)

The method according to Supplementary Note A1 or A2, further comprising including into the request acknowledge message a Cell Group ID information element meaning that the secondary base station will use the SN terminated bearer that uses both resources in the Master Cell Group (MCG) and resources in the Secondary Cell Group (SCG).

(Supplementary Note A4)

The method according to any one of Supplementary Notes A1 to A3, wherein the request acknowledge message is an S-NODE ADDITION REQUEST ACKNOWLEDGE message or an S-NODE MODIFICATION REQUEST ACKNOWLEDGE message.

(Supplementary Note A5)

The method according to any one of Supplementary Notes A1 to A4, wherein the request message is an S-NODE ADDITION REQUEST message or an S-NODE MODIFICATION REQUEST message.

(Supplementary Note A6)

A method of a master base station in Dual Connectivity, comprising:

transmitting a request message to a secondary base station of the Dual Connectivity; and if the secondary base station uses an SN terminated bearer that uses both resources in a Master Cell Group (MCG) and resources in a Secondary Cell Group (SCG), receiving a request acknowledge message containing a UL Configuration Information Element (IE) from the secondary base station as a response to the request message.

(Supplementary Note A7)

The method according to Supplementary Note A6, wherein the UL Configuration information element is an information element indicating how a terminal device uses an uplink of the secondary base station.

(Supplementary Note A8)

The method according to Supplementary Note A6 or A7, further comprising including into the request acknowledge message a Cell Group ID information element meaning that the secondary base station will use the SN terminated bearer that uses both resources in the Master Cell Group (MCG) and resources in the Secondary Cell Group (SCG).

(Supplementary Note A9)

The method according to any one of Supplementary Notes A6 to A8, wherein the request acknowledge message is an S-NODE ADDITION REQUEST ACKNOWLEDGE message or an S-NODE MODIFICATION REQUEST ACKNOWLEDGE message.

(Supplementary Note A10)

The method according to any one of Supplementary Notes A6 to A9, wherein the request message is an S-NODE ADDITION REQUEST message or an S-NODE MODIFICATION REQUEST message.

(Supplementary Note A11)

A secondary base station in Dual Connectivity, comprising a receiver and a transmitter, wherein the receiver is configured to receive a request message from a master base station of the Dual Connectivity, and the transmitter is configured to, if the secondary base station uses an SN terminated bearer that uses both resources in a Master Cell Group (MCG) and resources in a Secondary Cell Group (SCG), transmit a request acknowledge message containing a UL Configuration Information Element (IE) to the master base station as a response to the request message.

(Supplementary Note A12)

The secondary base station according to Supplementary Note A11, wherein the UL Configuration information element is an information element indicating how a terminal device uses an uplink of the secondary base station.

(Supplementary Note A13)

The secondary base station according to Supplementary Note A11 or A12, wherein the transmitter is configured to include into the request acknowledge message a Cell Group ID information element meaning that the secondary base station will use the SN terminated bearer that uses both resources in the Master Cell Group (MCG) and resources in the Secondary Cell Group (SCG).

(Supplementary Note A14)

The secondary base station according to any one of Supplementary Notes A11 to A13, wherein the request acknowledge message is an S-NODE ADDITION REQUEST ACKNOWLEDGE message or an S-NODE MODIFICATION REQUEST ACKNOWLEDGE message.

(Supplementary Note A15)

The secondary base station according to any one of Supplementary Notes A11 to A14, wherein the request message is an S-NODE ADDITION REQUEST message or an S-NODE MODIFICATION REQUEST message.

(Supplementary Note A16)

A master base station in Dual Connectivity, comprising a transmitter and a receiver, wherein the transmitter is configured to transmit a request message to a secondary base station of the Dual Connectivity, and the receiver is configured to, if the secondary base station uses an SN terminated bearer that uses both resources in a Master Cell Group (MCG) and resources in a Secondary Cell Group (SCG), receive a request acknowledge message containing a UL Configuration Information Element (IE) from the secondary base station as a response to the request message.

(Supplementary Note A17)

The master base station according to Supplementary Note A16, wherein the UL Configuration information element is an information element indicating how a terminal device uses an uplink of the secondary base station.

(Supplementary Note A18)

The master base station according to Supplementary Note A16 or A17, wherein the receiver is configured to receive the request acknowledge message containing a Cell Group ID information element meaning that the secondary base station will use the SN terminated bearer that uses both resources in the Master Cell Group (MCG) and resources in the Secondary Cell Group (SCG).

(Supplementary Note A19)

The master base station according to any one of Supplementary Notes A16 to A18, wherein the request acknowledge message is an S-NODE ADDITION REQUEST ACKNOWLEDGE message or an S-NODE MODIFICATION REQUEST ACKNOWLEDGE message.

(Supplementary Note A20)

The master base station according to any one of Supplementary Notes A16 to A19, wherein the request message is an S-NODE ADDITION REQUEST message or an S-NODE MODIFICATION REQUEST message.

This application is based upon and claims the benefit of priority from Japanese Patent Application No. 2020-176218, filed on Oct. 20, 2020, the disclosure of which is incorporated herein in its entirety by reference.

REFERENCE SIGNS LIST

1 Master Node (MN)
2 Secondary Node (SN)
3 User Equipment (UE)
1404 Processor
1405 Memory
1406 Modules

What is claimed is:

1. A method of a secondary node in Dual Connectivity, comprising:

receiving a request message, comprising an S-NODE ADDITION REQUEST, from a master node of the Dual Connectivity; and transmitting an acknowledge message, comprising an S-NODE ADDITION REQUEST ACKNOWLEDGE to the master node as a response to the request message, wherein, based on a data radio bearer (DRB) having both master cell group (MCG) resource and secondary cell group (SCG) resource configured, the acknowledge message comprises uplink (UL) configuration information, the UL configuration information indicating information about UL usage in the master node.

2. The method according to claim 1, wherein the UL configuration information indicates how a User Equipment (UE) uses an uplink at the master node.

3. The method according to claim 1, wherein the UL configuration information is an information element associated with the DRB.

4. The method according to claim 1, wherein the DRB is configured as a DRB terminated at the secondary node.

5. The method according to claim 1, wherein the acknowledge message comprises the UL configuration information in a case where the information, in the acknowledge message, indicates the DRB having both MCG resource and SCG resource configured.

6. The method according to claim 1, wherein the UL configuration information comprises an enumerated value indicating one of: "no data", "shared", or "only".

7. A method of a master node in Dual Connectivity, comprising:

transmitting a request message, comprising an S-NODE ADDITION REQUEST, to a secondary node of the Dual Connectivity; and receiving an acknowledge message, comprising an S-NODE ADDITION REQUEST ACKNOWLEDGE, from the secondary node as a response to the request message, wherein, based on a data radio bearer (DRB) having both master cell group (MCG) resource and secondary cell group (SCG) resource configured, the acknowledge message comprises uplink (UL) configuration information, the UL configuration information indicating information about UL usage in the master node.

8. The method according to claim 7, wherein the UL configuration information indicates how a User Equipment (UE) uses an uplink at the master node.

9. The method according to claim 7, wherein the UL configuration information is an information element associated with the DRB.

10. The method according to claim 7, wherein the DRB is configured as a DRB terminated at the secondary node.

11. The method according to claim 7, wherein the acknowledge message comprises the UL configuration information in a case where the information, in the acknowledge message, indicates the DRB having both MCG resource and SCG resource configured.

12. The method according to claim 7, wherein the UL configuration information comprises an enumerated value indicating one of: "no data", "shared", or "only".

13. A secondary node in Dual Connectivity, comprising:
at least one memory; and
at least one processor coupled to the at least one memory and configured to:
receive a request message, comprising an S-NODE ADDITION REQUEST, from a master node of the Dual Connectivity; and
transmit an acknowledge message, comprising an S-NODE ADDITION REQUEST ACKNOWLEDGE, to the master node as a response to the request message,
wherein, based on a data radio bearer (DRB) has both master cell group (MCG) resource and secondary cell group (SCG) resource configured, the acknowledge message comprises uplink (UL) configuration information, the UL configuration information indicating information about UL usage in the master node.

14. The secondary node according to claim 13, wherein the UL configuration information indicates how a User Equipment (UE) uses an uplink at the master node.

15. The secondary node according to claim 13, wherein the acknowledge message comprises the UL configuration information in a case where the information, in the acknowledge message, indicates the DRB having both MCG resource and SCG resource configured.

16. The secondary node according to claim 13, wherein the UL configuration information comprises an enumerated value indicating one of: "no data", "shared", or "only".

17. A master node in Dual Connectivity, comprising:
at least one memory; and
at least one processor coupled to the at least one memory and configured to:
transmit a request message, comprising an S-NODE ADDITION REQUEST, to a secondary node of the Dual Connectivity; and
receive an acknowledge message, comprising an S-NODE ADDITION REQUEST ACKNOWLEDGE, from the secondary node as a response to the request message,
wherein, based on a data radio bearer (DRB) having both master cell group (MCG) resource and secondary cell group (SCG) resource configured, the acknowledge message comprises uplink (UL) configuration information, the UL configuration information indicating information about UL usage in the master node.

18. The master node according to claim 17, wherein the UL configuration information indicates how a User Equipment (UE) uses an uplink at the master node.

19. The master node according to claim 17, wherein the acknowledge message comprises the UL configuration information in a case where the information, in the acknowledge message, indicates the DRB having both MCG resource and SCG resource configured.

20. The master node according to claim 17, wherein the UL configuration information comprises an enumerated value indicating one of: "no data", "shared", or "only".

21. A User Equipment (UE) comprising:
at least one memory; and
at least one processor coupled to the at least one memory and configured to communicate with a master node and a secondary node in Dual Connectivity,
wherein the secondary node is configured to:
receive a request message, comprising an S-NODE ADDITION REQUEST, from a master node of the Dual Connectivity; and
transmit an acknowledgement message, comprising an S-NODE ADDITION REQUEST ACKNOWLEDGE, to the master node as a response to the request message,
wherein, based on a data radio bearer (DRB) having both master cell group (MCG) resource and secondary cell group (SCG) resource configured, the acknowledge message comprises uplink (UL) configuration information, the UL configuration information indicating information about UL usage in the master node.

22. The UE according to claim 21, wherein the UL configuration information indicates how a UE uses an uplink at the master node.

23. The UE according to claim 21, wherein the acknowledge message comprises the UL configuration information in a case where the information, in the acknowledge message, indicates the DRB having both MCG resource and SCG resource configured.

24. The UE according to claim 21, wherein the UL configuration information comprises an enumerated value indicating one of: "no data", "shared", or "only".

25. A method of a User Equipment (UE), comprising:
communicating with a master node and a secondary node in Dual Connectivity,
wherein the secondary node:
receives a request message, comprising an S-NODE ADDITION REQUEST, from a master node of the Dual Connectivity; and
transmits an acknowledge message, comprising an S-NODE ADDITION REQUEST ACKNOWLEDGE, to the master node as a response to the request message,
wherein, based on a data radio bearer (DRB) has both master cell group (MCG) resource and secondary cell group (SCG) resource configured, the acknowledge message comprises uplink (UL) configuration information, the UL configuration information indicating information about UL usage in the master node.

26. The method according to claim 25, wherein the UL configuration information indicates how a User Equipment (UE) uses an uplink at the master node.

27. The method according to claim 25, wherein the UL configuration information is an information element associated with the DRB.

28. The method according to claim 25, wherein the DRB is configured as a DRB terminated at the secondary node.

29. The method according to claim 25, wherein the acknowledge message comprises the UL configuration information in a case where the information, in the acknowledge message, indicates the DRB having both MCG resource and SCG resource configured.

30. The method according to claim 25, wherein the UL configuration information comprises an enumerated value indicating one of: "no data", "shared", or "only".

* * * * *